(12) United States Patent
Liu

(10) Patent No.: US 11,546,267 B2
(45) Date of Patent: Jan. 3, 2023

(54) METHOD FOR DETERMINING DESIGNATED FORWARDER (DF) OF MULTICAST FLOW, DEVICE, AND SYSTEM

(71) Applicant: Huawei Technologies Co., Ltd., Shenzhen (CN)

(72) Inventor: Yisong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/234,407

(22) Filed: Apr. 19, 2021

(65) Prior Publication Data

US 2021/0328936 A1 Oct. 21, 2021

Related U.S. Application Data

(63) Continuation of application No. PCT/CN2019/094198, filed on Jul. 1, 2019.

(30) Foreign Application Priority Data

Oct. 19, 2018 (CN) .......................... 201811222225.6

(51) Int. Cl.
*H04L 47/2483* (2022.01)
*H04L 12/46* (2006.01)
(Continued)

(52) U.S. Cl.
CPC ...... *H04L 47/2483* (2013.01); *H04L 12/4641* (2013.01); *H04L 47/33* (2013.01);
(Continued)

(58) Field of Classification Search
CPC . H04L 47/2483; H04L 12/4641; H04L 47/33; H04L 47/762; H04L 47/781;
(Continued)

(56) References Cited

U.S. PATENT DOCUMENTS 10,805,235 B2 * 10/2020 Kulkarni ............. H04L 47/2441
2017/0141963 A1 * 5/2017 Chalapathy ............. H04L 45/50
(Continued)

FOREIGN PATENT DOCUMENTS

CN 103326940 A 9/2013
CN 103338153 A 10/2013
(Continued)

OTHER PUBLICATIONS

Yildiz et al., "Error Analysis of Single Channel Switched DF Receivers for Non-Zero-Bandwidth Signals," 2018 26th Signal Processing and Communications Applications Conference (SIU), Date of Conference: May 2-5, 2018, Date Added to IEEE Xplore: Jul. 9, 2018, total 4 pages (2018).
(Continued)

Primary Examiner — Jung H Park
(74) Attorney, Agent, or Firm — Leydig, Voit & Mayer, Ltd.

(57) ABSTRACT

A method for determining a designated forwarder (DF) of a multicast flow, a device, and a system are disclosed. In an Ethernet virtual private network (EVPN) scenario, a customer edge (CE) device is connected to a plurality of provider edge (PE) devices in a dual-homed or multi-homed manner. A first PE device is any one of the plurality of PE devices. After determining that the CE device connected to an Ethernet link joins a multicast group of a multicast flow, the first PE device determines bandwidth occupation statuses of a plurality of Ethernet links included in an Ethernet segment (ES) to which the Ethernet link belongs, and then determines, as a DF of the multicast flow based on the multicast flow bandwidth occupation statuses of the plurality of Ethernet links, a PE device corresponding to an Ethernet link that occupies lowest multicast flow bandwidth.

26 Claims, 5 Drawing Sheets

(51) Int. Cl.
  *H04L 47/33* (2022.01)
  *H04L 47/762* (2022.01)
  *H04L 47/78* (2022.01)
  *H04L 47/80* (2022.01)
(52) U.S. Cl.
  CPC .......... *H04L 47/762* (2013.01); *H04L 47/781* (2013.01); *H04L 47/806* (2013.01)
(58) Field of Classification Search
  CPC . H04L 47/806; H04L 47/822; H04L 45/7453; H04L 47/125; H04L 2012/4629; H04L 45/16; H04L 45/50; H04L 45/38
  See application file for complete search history.

(56) References Cited

U.S. PATENT DOCUMENTS

| | | | |
|---|---|---|---|
| 2018/0054391 A1 | | 2/2018 | Jain et al. |
| 2018/0167458 A1 | | 6/2018 | Ould-Brahim et al. |
| 2018/0287946 A1 | * | 10/2018 | Nagarajan ............. H04L 65/611 |
| 2019/0166407 A1 | * | 5/2019 | Sajassi ................. H04L 65/611 |
| 2020/0236444 A1 | * | 7/2020 | Sajassi ................. H04L 65/611 |

FOREIGN PATENT DOCUMENTS

| | | | | |
|---|---|---|---|---|
| CN | 103348630 A | | | 10/2013 |
| CN | 103685040 A | | | 3/2014 |
| CN | 103685040 B | * | | 1/2017 |
| CN | 108199947 A | | | 6/2018 |
| CN | 108234357 A | | | 6/2018 |

OTHER PUBLICATIONS

J. Rabadan Ed. et al., "Preference-based EVPN DF Election draft-ietf-bess-evpn-pref-df-01," BESS Workgroup Internet Draft, total 12 pages (Apr. 9, 2018).

J. Rabadan Ed. et al., "Framework for EVPN Designated Forwarder Election Extensibility, draft-ietf-bess-evpn-df-election-framework-03," BESS Workgroup Internet Draft, total 26 pages (May 24, 2018).

Zhou et al., "Technology Research on P2P Flow Application Layer Real-time Detection," Jilin University, total 66 pages (May 2012). With English abstract.

N. Malhotra Ed. et al., "Weighted Multi-Path Procedures for EVPN All-Active Multi-Homing, draft-malhotra-bess-evpn-unequal-lb-04," INTERNET-DRAFT, total 18 pages (Jul. 16, 2018).

A. Sajassi et al., "IGMP and MLD Proxy for EVPN, draft-ietf-bess-evpn-igmp-mld-proxy-02," BESS Working Group Internet-Draft, total 28 pages (Jun. 24, 2018).

Mohapatra et al., "BGP Link Bandwidth Extended Community draft-ietf-idr-link-bandwidth-07.txt," Network Working Group Internet-Drall, total 5 pages (Mar. 5, 2018).

Liu et al., "Multicast DF Election for EVPN based on bandwidth or quantity, draft-liu-bess-evpn-mcast-bw-quantity-df-election-01," BESS Working Group Internet Draft, total 11 pages (Nov. 26, 2019).

A. Sajassi et al., "Per multicast flow Designated Forwarder Election for EVPN draft-sajassi-bess-evpn-per-mcast-flow-df-election-01," BESS WorkGroup Internet-Draft, total 12 pages (Jun. 28, 2018).

A. Sajassi Ed et al., "BGP MPLS-Based Ethernet VPN," Internet Engineering Task Force (IETF), Request for Comments: 7432, total 56 pages (Feb. 2015).

* cited by examiner

METHOD FOR DETERMINING DESIGNATED FORWARDER (DF) OF MULTICAST FLOW, DEVICE, AND SYSTEM

CROSS-REFERENCE TO RELATED APPLICATIONS

This application is a continuation of International Application No. PCT/CN2019/094198, filed on Jul. 1, 2019, which claims priority to Chinese Patent Application No. 201811222225.6, filed on Oct. 19, 2018. The disclosures of the aforementioned applications are hereby incorporated by reference in their entireties.

FIELD

This application relates to the field of communications technologies, and in particular, to a method for determining a designated forwarder (DF) of a multicast flow, a device, and a system.

BACKGROUND

Multicast is a data transmission mode in which data is simultaneously sent to a plurality of receivers on a transmission control protocol (TCP)/internet protocol (IP) network in an efficient manner by using one multicast address. A multicast source sends a multicast flow to a multicast group member in a multicast group through a link on the network, and all multicast group members in the multicast group can receive the multicast flow. The multicast transmission mode implements a point-to-multipoint data connection between the multicast source and the multicast group members. The multicast flow needs to be transmitted once on each network link, and the multicast flow is replicated when the link has branches. Therefore, in the multicast transmission mode, data transmission efficiency is improved, and a possibility of congestion on a backbone network is reduced.

An Ethernet virtual private network (EVPN) is a layer 2 virtual private network (VPN) technology. The EVPN connects customer sites in different regions by using a cross-internet protocol (IP)/multiprotocol label switching (MPLS) bearer network. This is equivalent to that the customer sites are located on one local area network (LAN).

In an EVPN scenario, a customer edge (CE) device may receive a multicast flow from a remote multicast source by using a plurality of provider edge (PE) devices. The CE device is connected to the plurality of PE devices through a plurality of Ethernet links, and the plurality of Ethernet links belong to one Ethernet segment (ES). To avoid a waste of network resources caused by receiving duplicate traffic by the CE device from the plurality of PE devices, a designated forwarder (DF) election mechanism is introduced in the EVPN. In the EVPN scenario, the plurality of PE devices elect a DF based on a hash algorithm. However, the hash-based DF election mechanism may cause overload of some of the plurality of Ethernet links and poor bandwidth utilization of some of the plurality of Ethernet links, thereby degrading load sharing performance.

SUMMARY

In view of this, embodiments of this application provide a method for determining a DF of a multicast flow, a device, and a system. On an EVPN, a PE device determines a DF of a multicast flow based on bandwidth occupation statuses of a plurality of Ethernet links that belong to one ES, thereby helping improve equalization of load sharing for multicast flow transmission on the EVPN.

Technical solutions provided in the embodiments of this application are as follows.

According to a first aspect, a method for determining a DF of a multicast flow is provided. The method is used on an Ethernet virtual private network EVPN. The EVPN includes a first PE device, a second PE device, and a CE device. The CE device is connected to the first PE device through a first Ethernet link. The CE device is connected to the second PE device through a second Ethernet link. The first Ethernet link and the second Ethernet link belong to one ES. The method includes: the first PE device receives a first join packet. The first join packet is used to indicate that the CE device requests to join a first multicast group for receiving a first multicast flow. The first multicast flow is a multicast flow transmitted by a multicast source of the EVPN to a multicast group member in the first multicast group. Then the first PE device adds the CE device to the first multicast group based on the first join packet. In addition, the first PE device determines whether a first ratio is less than a second ratio. The first ratio is a ratio of first allocated bandwidth to first link bandwidth. The first allocated bandwidth indicates allocated bandwidth of total bandwidth that is on the first Ethernet link and that can be allocated to a multicast service. The first link bandwidth indicates the total bandwidth that is on the first Ethernet link and that can be allocated to a multicast service. The second ratio is a ratio of second allocated bandwidth to second link bandwidth. The second allocated bandwidth indicates allocated bandwidth of total bandwidth that is on the second Ethernet link and that can be allocated to a multicast service. The second link bandwidth indicates the total bandwidth that is on the second Ethernet link and that can be allocated to a multicast service. When the first PE device determines that the first ratio is less than the second ratio, the first PE device determines that the first PE device is a DF of the first multicast flow. In response to the determining, by the first PE device, that the first PE device is a DF of the first multicast flow, the first PE device allocates bandwidth to the first multicast flow.

According to the foregoing embodiment, in an EVPN scenario, after a PE device determines that a CE device connected to an Ethernet link joins a multicast group of a multicast flow, the PE device determines bandwidth occupation statuses of a plurality of Ethernet links included in an ES to which the Ethernet link belongs. Then the PE device determines, as a DF of the multicast flow based on the multicast flow bandwidth occupation statuses of the plurality of Ethernet links, a PE device corresponding to an Ethernet link that occupies lowest multicast flow bandwidth. This helps improve equalization of load sharing for multicast flow transmission on an EVPN.

In a possible implementation of the first aspect, the EVPN further includes a third PE device, the CE device is connected to the third PE device through a third Ethernet link, and the third Ethernet link belongs to the ES. Before the first PE device determines whether the first ratio is less than the second ratio, the method further includes: the first PE device determines that the first ratio is less than a third ratio. The third ratio is a ratio of third allocated bandwidth to third link bandwidth. The third allocated bandwidth indicates allocated bandwidth of total bandwidth that is on the third Ethernet link and that can be allocated to a multicast service. The third link bandwidth indicates the total bandwidth that is on the third Ethernet link and that can be allocated to a multicast service.

In another possible implementation of the first aspect, the method further includes: when the first PE device determines that the first ratio is not less than the second ratio and the first ratio is greater than the second ratio, the first PE device determines that the first PE device is a non-designated forwarder (non-DF) of the first multicast flow. In response to the determining, by the first PE device, that the first PE device is a non-DF of the first multicast flow, the first PE device skips allocating bandwidth to the first multicast flow.

In still another possible implementation of the first aspect, the method further includes: when the first PE device determines that the first ratio is not less than the second ratio and the first ratio is equal to the second ratio, and when the first PE device determines that a value of an IP address of the first PE device is greater than a value of an IP address of the second PE device, the first PE device determines that the first PE device is a DF of the first multicast flow.

In still another possible implementation of the first aspect, the method further includes: when the first PE device determines that the first ratio is not less than the second ratio and the first ratio is equal to the second ratio, and when the first PE device determines that the first link bandwidth is greater than the second link bandwidth, the first PE device determines that the first PE device is a DF of the first multicast flow.

In still another possible implementation of the first aspect, the method further includes: when the first PE device determines that the first ratio is not less than the second ratio and the first ratio is equal to the second ratio, the first PE device determines, based on a hash algorithm, that the first PE device is a DF of the first multicast flow.

In still another possible implementation of the first aspect, before the first PE device determines whether the first ratio is less than the second ratio, the method further includes: the first PE device receives a second Ethernet segment route sent by the second PE device. The second Ethernet segment route includes a second link bandwidth extended community attribute. The second link bandwidth extended community attribute is used to carry the second link bandwidth. The first PE device sends a first Ethernet segment route to the second PE device. The first Ethernet segment route includes a first link bandwidth extended community attribute. The first link bandwidth extended community attribute is used to carry the first link bandwidth.

According to the foregoing implementation, a PE device may automatically obtain link bandwidth of all Ethernet links included in an ES.

In still another possible implementation of the first aspect, the first join packet is a multicast group join packet sent by the CE device.

In still another possible implementation of the first aspect, the method further includes: the first PE device sends a first join synchronization route to the second PE device. The first join synchronization route is used to indicate that the CE device requests to join the first multicast group for receiving the first multicast flow.

In still another possible implementation of the first aspect, the first join synchronization route includes a first multicast DF extended community attribute. The first multicast DF extended community attribute carries an IP address of a PE device that serves as a DF of the first multicast flow.

In still another possible implementation of the first aspect, the first join packet is a second join synchronization route sent by the second PE device.

In still another possible implementation of the first aspect, the method further includes: the first PE device determines, based on a withdraw message for a first Ethernet auto-discovery per Ethernet segment route and that is received from the third PE device, that the third Ethernet link exits the ES. The withdraw message indicates that the third PE device withdraws the first Ethernet auto-discovery per Ethernet segment route. The first PE device determines, based on the first link bandwidth and the second link bandwidth, or based on a value of an IP address of the first PE device and a value of an IP address of the second PE device, a PE device that serves as a DF of a second multicast flow. Before the third Ethernet link exits the ES, the DF of the second multicast flow is the third PE device. The second multicast flow is a multicast flow transmitted by the multicast source of the EVPN to a multicast group member in a second multicast group. The CE device is a multicast group member in the second multicast group. The first PE device sends, to the second PE device, a third join synchronization route corresponding to the second multicast flow. The third join synchronization route includes a second multicast DF extended community attribute. The second multicast DF extended community attribute carries an IP address of the PE device that serves as the DF of the second multicast flow.

According to the foregoing implementation, when an Ethernet link in an ES exits the ES, a multicast flow on the Ethernet link that exits the ES may be transferred to another Ethernet link in a timely manner, thereby ensuring that forwarding of the multicast flow is not interrupted.

In still another possible implementation of the first aspect, the method further includes: when the first PE device determines that the first ratio is not less than the second ratio and the first ratio is greater than the second ratio, the first PE device determines that the first PE device is a non-DF of the first multicast flow. In response to the determining, by the first PE device, that the first PE device is a non-DF of the first multicast flow, the first PE device skips allocating bandwidth to the first multicast flow. The first PE device determines, based on a second Ethernet auto-discovery per Ethernet segment route received from a fourth PE device, that a fourth Ethernet link joins the ES. The CE device is connected to the fourth PE device through the fourth Ethernet link. The first PE device changes a PE device that serves as a DF of a third multicast flow from the first PE device to the fourth PE device. The third multicast flow is a multicast flow transmitted by the multicast source of the EVPN to a multicast group member in a third multicast group. The CE device is a multicast group member in the third multicast group. The first PE device sends, to the second PE device and the fourth PE device, a fourth join synchronization route corresponding to the third multicast flow. The fourth join synchronization route includes a third multicast DF extended community attribute. The third multicast DF extended community attribute carries an IP address of the fourth PE device.

According to the foregoing implementation, when a new Ethernet link joins an ES, a multicast flow on an Ethernet link with comparatively high bandwidth usage in the ES may be migrated to the new Ethernet link, thereby improving equalization between Ethernet links in the ES.

According to a second aspect, a first PE device is provided. The first PE device has a function of implementing behavior of the first PE device in the foregoing method. The function may be implemented based on hardware, or may be implemented based on hardware executing corresponding software. The hardware or software includes one or more modules corresponding to the function.

In a possible design, a structure of the first PE device includes a processor and an interface. The processor is configured to support the first PE device in performing a corresponding function in the foregoing method. The interface is configured to support communication between the first PE device and a second network device, a transmit-end device, or a receive-end device, and send information or instructions included in the foregoing method to the second network device, the transmit-end device, or the receive-end device, or receive information or instructions included in the foregoing method from the second network device, the transmit-end device, or the receive-end device. The first PE device may further include a memory. The memory is configured to be coupled to the processor, and the memory stores program instructions and data for the first PE device.

In another possible design, the first PE device includes a processor, a transmitter, a receiver, a random access memory, a read-only memory, and a bus. The processor is separately coupled to the transmitter, the receiver, the random access memory, and the read-only memory by using the bus. When the first PE device needs to operate, the first PE device is started by using a bootloader boot system in a basic input/output system or an embedded system that is solidified in the read-only memory, to guide the first PE device into a normal operating state. After entering the normal operating state, the first PE device runs an application program and an operating system in the random access memory, so that the processor performs the method according to any one of the first aspect or the possible implementations of the first aspect.

According to a third aspect, a first PE device is provided. The first PE device includes a main control board and an interface board, and may further include a switching board. The first PE device is configured to perform the method according to any one of the first aspect or the possible implementations of the first aspect. For example, the first PE device includes modules configured to perform the method according to any one of the first aspect or the possible implementations of the first aspect.

According to a fourth aspect, a first PE device is provided. The first PE device includes a controller and a first forwarding sub-device. The first forwarding sub-device includes an interface board, and may further include a switching board. The first forwarding sub-device is configured to perform a function of the interface board in the third aspect, and may further perform a function of the switching board in the third aspect. The controller includes a receiver, a processor, a transmitter, a random access memory, a read-only memory, and a bus. The processor is separately coupled to the receiver, the transmitter, the random access memory, and the read-only memory by using the bus. When the controller needs to operate, the controller is started by using a bootloader boot system in a basic input/output system or an embedded system that is solidified in the read-only memory, to guide the controller into a normal operating state. After entering the normal operating state, the controller runs an application program and an operating system in the random access memory, so that the processor performs a function of the main control board in the third aspect.

According to a fifth aspect, a computer storage medium is provided, configured to store programs, code, or instructions used by the foregoing first PE device. When a processor or a hardware device executes the programs, the code, or the instructions, the functions or the steps of the first PE device in the first aspect may be performed.

According to a sixth aspect, an EVPN system is provided. The EVPN system includes a first PE device. The first PE device is the first PE device in the second aspect, the third aspect, or the fourth aspect.

According to the foregoing solutions, in an EVPN scenario, after a PE device determines that a CE device connected to an Ethernet link joins a multicast group of a multicast flow, the PE device determines bandwidth occupation statuses of a plurality of Ethernet links included in an ES to which the Ethernet link belongs. Then the PE device determines, as a DF of the multicast flow based on the multicast flow bandwidth occupation statuses of the plurality of Ethernet links, a PE device corresponding to an Ethernet link that occupies lowest multicast flow bandwidth. This helps improve equalization of load sharing for multicast flow transmission on an EVPN.

DETAILED DESCRIPTION

The following separately provides detailed descriptions by using exemplary embodiments.

For an EVPN technology included in this application, refer to descriptions in the Internet Engineering Task Force (IETF) Request For Comments (RFC) 7432. Content of the RFC7432 is incorporated by reference in this application as if the content is reproduced in its entirety.

Figure 1:
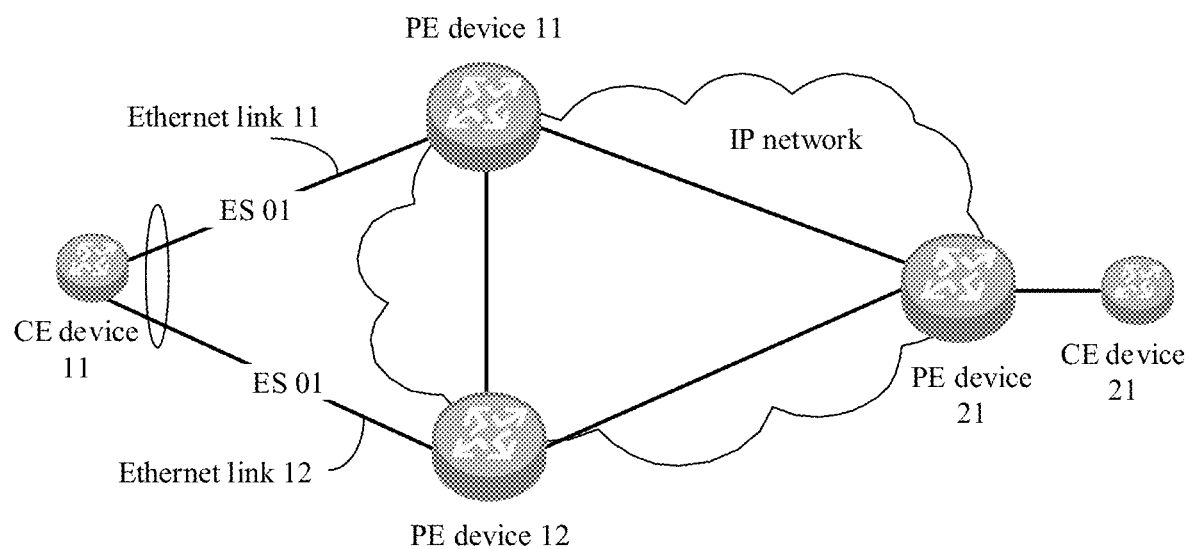
FIG. 1 is a schematic structural diagram of an EVPN according to an embodiment of this application.

FIG. 1 is a schematic structural diagram of an EVPN according to an embodiment of this application. As shown in FIG. 1, the EVPN includes an access side and a network side. The access side is configured to receive a multicast flow from the network side, and the access side communicates with the network side through an IP network. The IP network may be a metropolitan area network (MAN), a data center (DC) network, a mobile bearer network, or a fixed network. A typical mobile bearer network is an internet protocol radio access network (IP RAN).

The access side includes a CE device 11, a PE device 11, and a PE device 12. The CE device 11 is connected to the PE device 11 through an Ethernet link 11. The CE device 11 is connected to the PE device 12 through an Ethernet link 12. The Ethernet link 11 and the Ethernet link 12 belong to one ES, for example, an ES 01 in FIG. 1. In this way, the CE device 11 is dual-homed to the PE device 11 and the PE device 12 through the two Ethernet links. An Ethernet segment identifier (ESI) may be used to identify the ES 01. Using FIG. 1 as an example, ESI values, of the ES 01, for the Ethernet link 11 and the Ethernet link 12 are a same value, and the value is a non-zero value. The ESI includes a type field and an ESI value field. The type field is used to indicate an ESI generation manner. Two common generation manners are a type 0 and a type 1. The type 0 indicates that the ESI is generated through manual configuration. The type 1 indicates that the ESI is generated by using a link aggregation control protocol (LACP) running between a PE device and a CE device. A value range of the ESI value field is 0-0xFF, where "0x" indicates a hexadecimal system. For how to generate and set an ES and an ESI, refer to descriptions in chapter 5 of the RFC7432. Optionally, the PE device 11 is connected to the PE device 12 through an inter-chassis link. The PE device 11 and the PE device 12 may be routers or layer 3 switches. The CE device 11 may be a router, a switch, or a host. The PE device 11, the PE device 12, and the CE device 11 in this embodiment of this application may be corresponding devices defined in the RFC7432. When the CE device 11 is a router or a switch, the CE device 11 may be connected to one or more hosts. The host may be a physical device or a virtual machine (VM).

On the EVPN, the PE device 11 and the PE device 12 are a pair of border gateway protocol (BGP) peers. The BGP peer may also be referred to as an EVPN peer. "A pair of BGP peers" may be understood as follows: One device is a BGP peer of another device. For example, that the PE device 11 and the PE device 12 are a pair of BGP peers may be understood as meaning that the PE device 11 is a BGP peer of the PE device 12, or understood as meaning that the PE device 12 is a BGP peer of the PE 11 device. The BGP peer may also be referred to as a BGP neighbor. Correspondingly, the EVPN peer may also be referred to as an EVPN neighbor. In this application, for ease of description, the BGP peer is uniformly used in subsequent embodiments. The BGP peer is established by using an open message specified in the BGP, and the established BGP peer is maintained by using a keepalive message. For implementations of the open message and the keepalive message, refer to related descriptions in the IETF RFC2858 and the IETF RFC1771. In addition, route reflectors (RR) may be deployed on both devices between which a BGP peer is to be established, so as to establish the BGP peer by using the RRs.

The network side includes a PE device 21 and a CE device 21. The PE device 21 is connected to the CE device 21. The PE device 21 communicates with the PE device 11 through a first communication link. The PE device 21 communicates with the PE device 12 through a second communication link.

Figure 2:
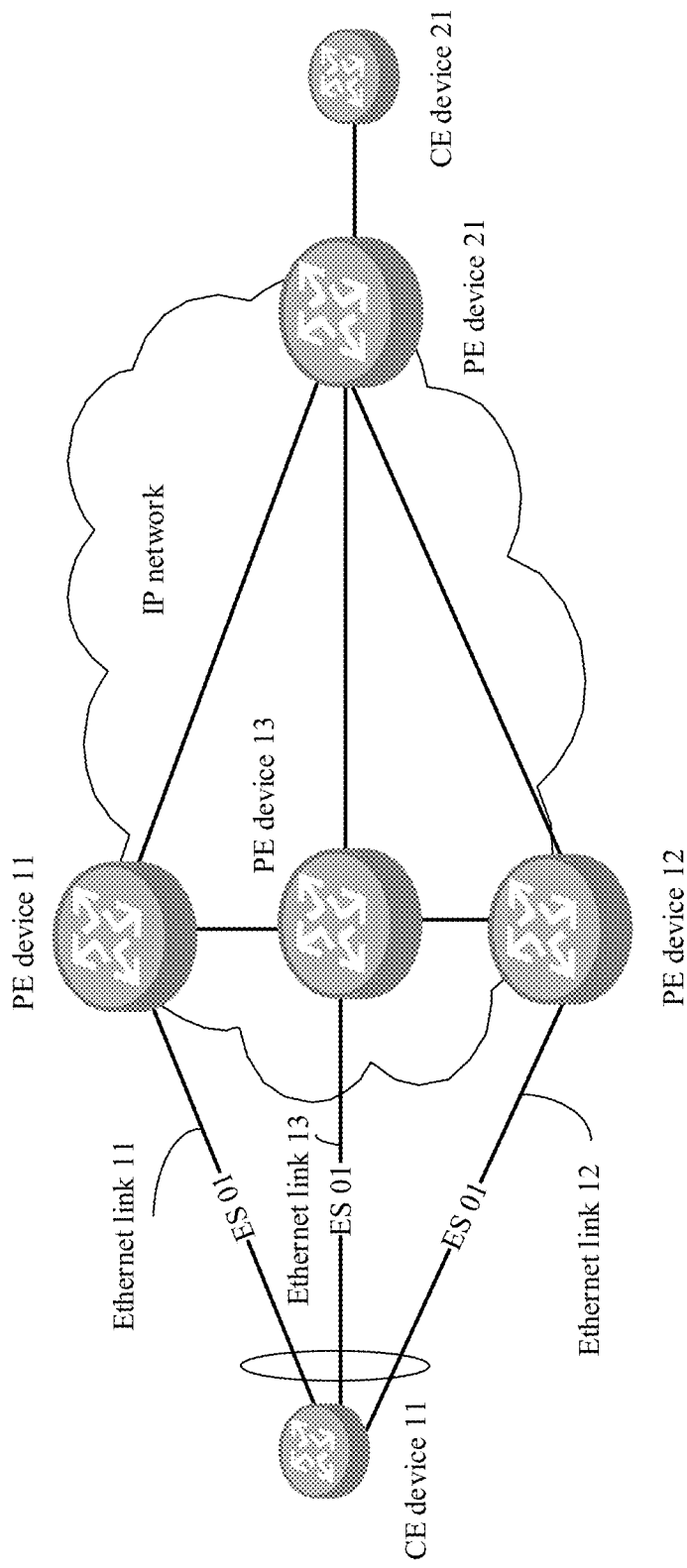
FIG. 2 is a schematic structural diagram of another EVPN according to an embodiment of this application.

FIG. 2 is a schematic structural diagram of another EVPN according to an embodiment of this application. A structure of the EVPN shown in FIG. 2 is similar to that of the EVPN shown in FIG. 1. The EVPN shown in FIG. 2 may be understood as an EVPN obtained by adding a PE device 13 based on the structure of the EVPN shown in FIG. 1. The following describes a difference between FIG. 2 and FIG. 1. Details about a similarity between FIG. 2 and FIG. 1 are not described.

The CE device 11 is connected to the PE device 13 through an Ethernet link 13, and the Ethernet link 13 belongs to the ES 01. Therefore, the Ethernet link 11, the Ethernet link 12, and the Ethernet link 13 belong to one ES. In this way, the CE device 11 is multi-homed to the PE device 11, the PE device 12, and the PE device 13 through the three Ethernet links. The PE device 13 is connected to the PE device 11 through an inter-chassis link. The PE device 13 is further connected to the PE device 12 through an inter-chassis link. The PE device 13 communicates with the PE device 21 through a third communication link. Based on the foregoing descriptions, in FIG. 2, any two of the PE device 11, the PE device 12, and the PE device 13 are a pair of BGP peers. Specifically, the PE device 11 and the PE device 12 are a pair of BGP peers, the PE device 11 and the PE device 13 are a pair of BGP peers, and the PE device 12 and the PE device 13 are a pair of BGP peers.

In this embodiment of this application, the CE device 21 serves as a multicast source device for sending a multicast flow, and the CE device 11 may serve as a multicast flow receiving device. For example, the CE device 21 sends a multicast flow 01, and the PE device 21 is responsible for forwarding the multicast flow 01 to the IP network. In FIG. 1, both the PE device 11 and the PE device 12 receive the multicast flow 01. If the CE device 11 is a multicast group member in a multicast group corresponding to the multicast flow 01, the PE device 11 is configured to forward the multicast flow 01 to the CE device 11 through the Ethernet link 11, and the PE device 12 is configured to forward the multicast flow 01 to the CE device 11 through the Ethernet link 12. In FIG. 2, all the PE device 11, the PE device 12, and the PE device 13 receive the multicast flow 01. If the CE device 11 is a multicast group member in a multicast group corresponding to the multicast flow 01, the PE device 11 is configured to forward the multicast flow 01 to the CE device 11 through the Ethernet link 11, the PE device 12 is configured to forward the multicast flow 01 to the CE device 11 through the Ethernet link 12, and the PE device 13 is configured to forward the multicast flow 01 to the CE device 11 through the Ethernet link 13.

In FIG. 1, if both the PE device 11 and the PE device 12 forward the multicast flow 01 to the CE device 11, the CE device 11 repeatedly receives traffic. In an EVPN scenario, by using a DF mechanism, the CE device 11 can be prevented from repeatedly receiving traffic. As shown in FIG. 1, the Ethernet link 11 and the Ethernet link 12 belong to one ES. It is assumed that the PE device 11 is a DF of the multicast flow 01, and the PE device 12 is a non-designated forwarder (non-DF) of the multicast flow 01. In this case, the PE device 11 serving as a DF of the multicast flow 01 is responsible for forwarding the multicast flow 01 to the CE device 11, and the PE device 12 serving as a non-DF of the multicast flow 01 does not forward the multicast flow 01 to the CE device 11.

Similarly, in FIG. 2, the Ethernet link 11, the Ethernet link 12, and the Ethernet link 13 belong to one ES. For one multicast flow, a PE device connected to one of Ethernet links that belong to one ES serves as a DF. As shown in FIG. 1, it is assumed that the PE device 11 is a DF of the multicast flow 01, and the PE device 12 and the PE device 13 are non-DFs of the multicast flow 01. In this case, the PE device 11 serving as a DF of the multicast flow 01 is responsible for forwarding the multicast flow 01 to the CE device 11, and the PE device 12 and the PE device 13 serving as non-DFs of the multicast flow 01 do not forward the multicast flow 01 to the CE device 11.

The RFC7432 provides a possible implementation of determining a DF of a multicast flow. For example, a DF and a non-DF of a corresponding VLAN are determined through election based on a virtual local area network (VLAN) identifier (ID) and IP addresses of PE devices that belong to one ES. For a specific implementation, refer to explanations and descriptions in the RFC7432. Details are not described herein.

In another possible implementation of determining a DF of a multicast flow, a PE device may determine a DF of a multicast flow based on a highest random weight (HRW) algorithm. The HRW algorithm is an implementation of a hash algorithm. For a specific implementation, refer to a working group draft of the IETF: draft-ietf-bess-evpn-df-election-framework-03 (Framework for EVPN Designated Forwarder Election Extensibility). Content of the working group draft draft-ietf-bess-evpn-df-election-framework-03 is incorporated by reference in this application as if the content is reproduced in its entirety. Details are not described herein.

In still another possible implementation of determining a DF of a multicast flow, a PE device may determine a DF of a multicast flow based on an extended HRW algorithm. For a specific implementation, refer to a working group draft of the IETF: draft-sajassi-bess-evpn-per-mcast-flow-df-election-01 (Per multicast flow Designated Forwarder Election for EVPN). Content of the working group draft draft-sajassi-bess-evpn-per-mcast-flow-df-election-01 is incorporated by reference in this application as if the content is reproduced in its entirety. Details are not described herein.

However, a hash algorithm-based DF election mechanism (for example, the foregoing HRW and extended HRW) may cause overload of some of the plurality of Ethernet links and poor bandwidth utilization of some of the plurality of Ethernet links, thereby degrading load sharing performance. Using FIG. 1 as an example, it is assumed that a multicast source of multicast flows G1 to G9, a total of nine multicast flows, is the CE device 21, and the CE device 11 serves as a multicast group member of each multicast flow. Through calculation based on the HRW algorithm, the PE device 11 serves as a DF of the multicast flows G1 to G7, a total of seven multicast flows; and the PE device 12 serves as a DF of the multicast flows G8 and G9, a total of two multicast flows. Assuming that demanded bandwidth of each multicast flow is 100 Mbps, transmission bandwidth load of the Ethernet link 11 is 700 Mbps, and transmission bandwidth load of the Ethernet link 12 is 200 Mbps. Therefore, the Ethernet link 11 may be congested due to overload, and the Ethernet link 12 may have poor bandwidth utilization. The Mbps indicates Mbit/s, that is, megabit per second.

According to the implementations of this application, on an EVPN, a PE device no longer relies on a hash algorithm-based DF election mechanism, and the PE device determines a DF of a multicast flow based on bandwidth occupation statuses of a plurality of Ethernet links that belong to one ES, thereby helping improve equalization of load sharing for multicast flow transmission on the EVPN.

Figure 3:
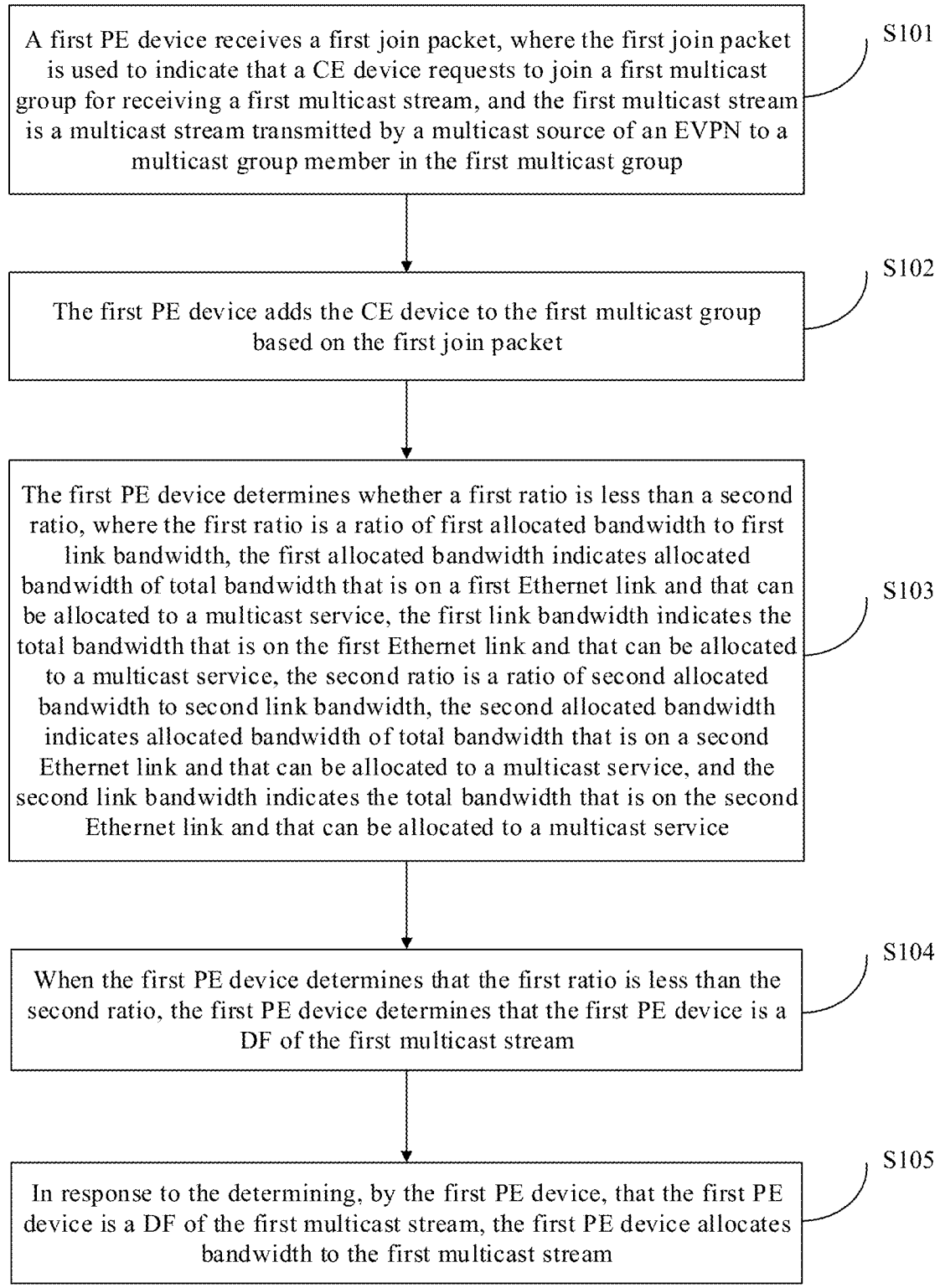
FIG. 3 is a flowchart of a method for determining a DF of a multicast flow according to an embodiment of this application.

FIG. 3 is a flowchart of a method for determining a DF of a multicast flow according to an embodiment of this application. The method shown in FIG. 3 may be used on the EVPN shown in FIG. 1 or FIG. 2. The EVPN includes a first PE device, a second PE device, and a CE device. The CE device is connected to the first PE device through a first Ethernet link. The CE device is connected to the second PE device through a second Ethernet link. The first Ethernet link and the second Ethernet link belong to one ES. With reference to FIG. 1 and FIG. 2, the first PE device is the PE device 11 in FIG. 1 or FIG. 2, the second PE device is the PE device 12 in FIG. 1 or FIG. 2, the CE device is the CE device 11 in FIG. 1 or FIG. 2, the first Ethernet link is the Ethernet link 11 in FIG. 1 or FIG. 2, the second Ethernet link is the Ethernet link 12 in FIG. 1 or FIG. 2, and the ES is the ES 01. In this embodiment of this application, the foregoing features may be equivalent to corresponding features, unless otherwise specified. The method shown in FIG. 3 includes S101 to S105.

At S101, the first PE device receives a first join packet. The first join packet is used to indicate that the CE device requests to join a first multicast group for receiving a first multicast flow. The first multicast flow is a multicast flow transmitted by a multicast source of the EVPN to a multicast group member in the first multicast group.

At S102, the first PE device adds the CE device to the first multicast group based on the first join packet.

As shown in FIG. 1, the CE device 21 located on the network side of the EVPN may send a multicast flow to the access side of the EVPN through the IP network. For example, the CE device 21 is a multicast source on the network side of the EVPN. For example, the CE device 21 is a server of an operator that provides a video service for a user. The CE device 21 sends the first multicast flow to the PE device 21. The first multicast flow may be expressed as (51, G1), where S1 indicates an IP address of the multicast source of the first multicast flow, that is, an IP address of the CE device 21, and G1 indicates an IP address of the first multicast group. The PE device 21 may forward the first multicast flow to the PE device 11 and the PE device 12 through the IP network. The first multicast flow may reach the CE device 11 through the PE device 11 and the Ethernet link 11, or the first multicast flow may reach the CE device 11 through the PE device 12 and the Ethernet link 12.

To receive the first multicast flow, the CE device 11 needs to request to join the first multicast group of the first multicast flow. In a possible implementation, the CE device 11 sends a first multicast group join packet to the PE device 11 through the Ethernet link 11. The first multicast group join packet is the first join packet, and the first join packet is used to indicate that the CE device 11 requests to join the first multicast group for receiving the first multicast flow. After receiving the first multicast group join packet, the PE device 11 adds the CE device 11 to the first multicast group of the first multicast flow based on the first multicast group join packet. In this way, the PE device 11 may confirm that the CE device 11 becomes a multicast group member in the first multicast group, and the CE device 11 may receive, through the Ethernet link 11, the first multicast flow forwarded by the PE device 11. After receiving the first multicast group join packet, the PE device 11 generates a first join synchronization route (join synch route) based on the first multicast group join packet. The first join synchronization route is used to indicate that the CE device 11 requests to join the first multicast group for receiving the first multicast flow. The PE device 11 sends the first join synchronization route to the PE device 12. After receiving the first join synchronization route, the PE device 12 adds the CE device 11 to the first multicast group of the first multicast flow based on the first join synchronization route. In this way, the PE device 12 may confirm that the CE device 11 becomes a multicast group member in the first multicast group, and the CE device 11 may receive, through the Ethernet link 12, the first multicast flow forwarded by the PE device 12.

In another possible implementation, the CE device 11 sends a second multicast group join packet to the PE device 12 through the Ethernet link 12. After receiving the second multicast group join packet, the PE device 12 adds the CE device 11 to the first multicast group of the first multicast flow based on the second multicast group join packet. In this way, the PE device 12 may confirm that the CE device 11 becomes a multicast group member in the first multicast group, and the CE device 11 may receive, through the Ethernet link 12, the first multicast flow forwarded by the PE device 12. After receiving the second multicast group join packet, the PE device 12 generates a second join synchronization route based on the second multicast group join packet. The second join synchronization route is the first join packet, and the first join packet is used to indicate that the CE device 11 requests to join the first multicast group for receiving the first multicast flow. The PE device 12 sends the second join synchronization route to the PE device 11. After receiving the second join synchronization route, the PE device 11 adds the CE device 11 to the first multicast group of the first multicast flow based on the second join synchronization route. In this way, the PE device 11 may confirm that the CE device 11 becomes a multicast group member in the first multicast group, and the CE device 11 may receive, through the Ethernet link 11, the first multicast flow forwarded by the PE device 11.

In the foregoing implementation, the first multicast group join packet and the second multicast group join packet may be internet group management protocol (IGMP) packets. Correspondingly, the first join synchronization route and the second join synchronization route may be IGMP join synchronization routes (IGMP join synch route). For an implementation of the IGMP join synchronization route, refer to a working group draft of the IETF: draft-ietf-bess-evpn-igmp-mld-proxy-02 (IGMP and MLD Proxy for EVPN). Content of the working group draft draft-ietf-bess-evpn-igmp-mld-proxy-02 is incorporated by reference in this application as if the content is reproduced in its entirety. Details are not described herein.

In the foregoing implementation, the first multicast group join packet and the second multicast group join packet may be protocol independent multicast (PIM) packets. Correspondingly, the first join synchronization route and the second join synchronization route may be PIM join synchronization routes (PIM join synch route). For an implementation of the PIM join synchronization route, refer to a working group draft of the IETF: draft-skr-bess-evpn-pim-proxy-01 (PIM Proxy in EVPN Networks). Content of the working group draft draft-skr-bess-evpn-pim-proxy-01 is incorporated by reference in this application as if the content is reproduced in its entirety. Details are not described herein.

In the foregoing descriptions, FIG. 1 is used as an example to describe the implementations in which the CE device 11 joins the first multicast group of the first multicast flow. The EVPN may include more than two PE devices connected to the CE device 11, for example, as shown in FIG. 3. In a network scenario shown in FIG. 3, the CE device 11 may join the first multicast group of the first multicast flow according to the foregoing implementations. For example, the CE device 11 sends a multicast group join packet to the PE device 11, and the PE device 11 advertises a join synchronization route to the PE device 12 and the PE device 13. Therefore, all the PE device 11, the PE device 12, and the PE device 13 may confirm that the CE device 11 joins the first multicast group of the first multicast flow. In this embodiment of this application, the CE device 11 is used as an example to describe a network device for receiving a multicast flow. In an actual scenario, the EVPN may include a plurality of CE devices 11, and each CE device 11 may join a multicast group and receive a multicast flow in the foregoing manners. In this embodiment of this application, the first multicast flow is used as an example for description. It should be understood that a plurality of multicast flows may be transmitted on the EVPN. The CE device 11 may join a multicast group corresponding to each multicast flow according to the foregoing implementations.

At S103, the first PE device determines whether a first ratio is less than a second ratio. The first ratio is a ratio of first allocated bandwidth to first link bandwidth. The first allocated bandwidth indicates allocated bandwidth of total bandwidth that is on the first Ethernet link and that can be allocated to a multicast service. The first link bandwidth indicates the total bandwidth that is on the first Ethernet link and that can be allocated to a multicast service. The second ratio is a ratio of second allocated bandwidth to second link bandwidth. The second allocated bandwidth indicates allocated bandwidth of total bandwidth that is on the second Ethernet link and that can be allocated to a multicast service. The second link bandwidth indicates the total bandwidth that is on the second Ethernet link and that can be allocated to a multicast service.

At S104, when the first PE device determines that the first ratio is less than the second ratio, the first PE device determines that the first PE device is a DF of the first multicast flow.

At S105, in response to the determining, by the first PE device, that the first PE device is a DF of the first multicast flow, the first PE device allocates bandwidth to the first multicast flow.

According to S101 and S102, referring to FIG. 1, the CE device 11 may receive, through the Ethernet link 11, the first multicast flow forwarded by the PE device 11, or the CE device 11 may receive, through the Ethernet link 12, the first multicast flow forwarded by the PE device 12. In an actual scenario, if the CE device 11 receives the first multicast flow from both the PE device 11 and the PE device 12, the CE device 11 performs dual-reception of traffic, thereby causing a waste of network resources. Therefore, a DF election mechanism on the EVPN prevents the dual-reception of traffic. The PE device 11 determines whether the PE device 11 is a DF of the first multicast flow, to determine whether the PE device 11 can forward, to the CE device 11 through the Ethernet link 11, a multicast packet belonging to the first multicast flow. Similarly, the PE device 12 determines whether the PE device 12 is a DF of the first multicast flow, to determine whether the PE device 12 can forward, to the CE device 11 through the Ethernet link 12, a multicast packet belonging to the first multicast flow. In the following descriptions, the PE device 11 is used as an example to describe an implementation process of determining a DF of the first multicast flow by the PE device 11.

Before performing S103, the PE device 11 needs to learn of link bandwidth of all Ethernet links on the ES 01. As shown in FIG. 1, the PE device 11 needs to learn of link bandwidth of the Ethernet link 11 and the Ethernet link 12 that belong to the ES 01. Because the PE device 11 is connected to the Ethernet link 11, the PE device 11 may determine the first link bandwidth of the Ethernet link 11. The first link bandwidth indicates total bandwidth that is on the Ethernet link 11 and that can be allocated to a multicast service. For example, the first link bandwidth is total bandwidth used for forwarding a multicast service by the PE device 11 to the CE device 11 through the Ethernet link 11. For example, the PE device 11 may forward a plurality of types of services to the CE device 11 through the Ethernet link 11, for example, a unicast service, a multicast service, and a broadcast service. In this embodiment of this application, the first link bandwidth is bandwidth that can be allocated to the PE device 11 for forwarding a multicast service to the CE device 11 through the Ethernet link 11, that is, a sum of demanded bandwidth used for forwarding a multicast flow by the PE device 11 to the CE device 11 through the Ethernet link 11. A value of the first link bandwidth may be determined by the PE device 11 based on a forwarding capability of a line card of the PE device 11. For example, the forwarding capability of the line card of the PE device 11 is represented as a bandwidth of 2000 Mbps, where 500 Mbps is allocated to a unicast service for use, 1000 Mbps is allocated to a multicast service for use, and 500 Mbps is allocated to a broadcast service for use. In this case, 1000 Mbps is a value of the first link bandwidth. Alternatively, a value of the first link bandwidth may be determined by the PE device 11 based on physical bandwidth of the Ethernet link 11. For example, the physical bandwidth of the Ethernet link 11 is represented as 2000 Mbps, where 500 Mbps is allocated to a unicast service for use, 1000 Mbps is allocated to a multicast service for use, and 500 Mbps is allocated to a broadcast service for use. In this case, 1000 Mbps is a value of the first link bandwidth. Similarly, the PE device 12 may determine the second link bandwidth of the Ethernet link 12 according to the foregoing implementation. The second link bandwidth indicates bandwidth that can be allocated to the PE device 12 for forwarding a multicast service to the CE device 11 through the Ethernet link 12, that is, a sum of demanded bandwidth used for forwarding a multicast flow by the PE device 12 to the CE device 11 through the Ethernet link 12. Therefore, in this embodiment of this application, link bandwidth of an Ethernet link is bandwidth used for forwarding a multicast service.

The PE device 11 further needs to learn of the second link bandwidth of the Ethernet link 12. In a possible implementation, the PE device 11 may learn of the second link bandwidth through static configuration. For example, a network administrator directly configures, on the PE device 11, link bandwidth of an Ethernet link included in the ES 01. In another possible implementation, the EVPN may include a network management device, and the network management device sends, to the PE device 11, link bandwidth of an Ethernet link included in the ES 01. In still another possible implementation, the PE device 11 receives a second Ethernet segment route sent by the PE device 12. The second Ethernet segment route includes a second link bandwidth extended community attribute. The second link bandwidth extended community attribute is used to carry the second link bandwidth. The PE device 11 may obtain the second link bandwidth based on the second Ethernet segment route. For an implementation of the second Ethernet segment route, refer to corresponding explanations in the RFC7432. For an implementation of the second link bandwidth extended community attribute, refer to a working group draft of the IETF: draft-ietf-idr-link-bandwidth-07 (BGP Link Bandwidth Extended Community). Content of the working group draft draft-ietf-idr-link-bandwidth-07 is incorporated by reference in this application as if the content is reproduced in its entirety. Details are not described herein. Similarly, the PE device 11 may further send a first Ethernet segment route to the PE device 12. The first Ethernet segment route includes a first link bandwidth extended community attribute. The first link bandwidth extended community attribute is used to carry the first link bandwidth. The PE device 12 may obtain the first link bandwidth based on the first Ethernet segment route.

According to the foregoing implementations, the PE device 11 may obtain link bandwidth of all Ethernet links included in the ES 01, and the PE device 12 may also obtain the link bandwidth of all the Ethernet links included in the ES 01 in the same way. As shown in FIG. 1, after obtaining the first link bandwidth and the second link bandwidth, the PE device 11 may determine the first ratio and the second ratio based on the first link bandwidth and the second link bandwidth.

The first ratio is the ratio of the first allocated bandwidth to the first link bandwidth. The first allocated bandwidth indicates the allocated bandwidth of the total bandwidth that is on the first Ethernet link 11 and that can be allocated to a multicast service. The first link bandwidth indicates the total bandwidth that is on the first Ethernet link 11 and that can be allocated to a multicast service. The second ratio is the ratio of the second allocated bandwidth to the second link bandwidth. The second allocated bandwidth indicates the allocated bandwidth of the total bandwidth that is on the second Ethernet link 12 and that can be allocated to a multicast service. The second link bandwidth indicates the total bandwidth that is on the second Ethernet link 12 and that can be allocated to a multicast service. The first allocated bandwidth is bandwidth, allocated to a multicast service, of the total bandwidth that is on the Ethernet link 11 and that can be allocated to a multicast service. For example, a value of the first link bandwidth is 1000 Mbps. A DF of a multicast flow G1 and a multicast flow G2 is the PE device 11, a multicast group corresponding to the multicast flow G1 includes the CE device 11, and a multicast group corresponding to the multicast flow G2 includes the CE device 11. Neither the multicast flow G1 nor the multicast flow G2 includes the first multicast flow. Multicast service bandwidth allocated by the PE device 11 to the multicast flow G1 is 100 Mbps, and multicast service bandwidth allocated by the PE device 11 to the multicast flow G2 is 200 Mbps. Therefore, in the 1000 Mbps, allocated bandwidth is 300 Mbps, and remaining bandwidth is 700 Mbps.

With reference to the foregoing descriptions, the first ratio and the second ratio may be further understood based on the following descriptions. The first ratio is a ratio of a sum of demanded bandwidth of a multicast flow for which the PE device 11 serves as a DF and the CE device 11 serves as a multicast group member to the first link bandwidth. The second ratio is a ratio of a sum of demanded bandwidth of a multicast flow for which the PE device 12 serves as a DF and the CE device 11 serves as a multicast group member to the second link bandwidth. The sum of demanded bandwidth of a multicast flow for which the PE device 11 serves as a DF and the CE device 11 serves as a multicast group member means that, for a multicast flow corresponding to a multicast group that the CE device 11 has joined, where the multicast flow is forwarded to the CE device 11 by using the PE device 11 as a DF, the PE device 11 determines a sum of demanded bandwidth of the multicast flow. The sum of demanded bandwidth of a multicast flow for which the PE device 12 serves as a DF and the CE device 11 serves as a multicast group member means that, for a multicast flow corresponding to a multicast group that the CE device 11 has joined, where the multicast flow is forwarded to the CE device 11 by using the PE device 12 as a DF, the PE device 12 determines a sum of demanded bandwidth of the multicast flow. The "sum of demanded bandwidth of a multicast flow" mentioned in this embodiment of this application is equivalent to the "allocated bandwidth of total bandwidth that can be allocated to a multicast service" mentioned in this embodiment of this application, and these are merely two different expressions.

For example, it is assumed that the CE device 11 has joined a multicast group of a multicast flow G1, a multicast group of a multicast flow G2, a multicast group of a multicast flow G3, and a multicast group of a multicast flow G4, that is, the CE device 11 becomes a multicast group member of G1, a multicast group member of G2, a multicast group member of G3, and a multicast group member of G4. In addition, the PE device 11 is a DF for forwarding G1 and G2 to the CE device 11, and the PE device 12 is a DF for forwarding G3 and G4 to the CE device 11. Demanded bandwidth for transmitting G1 is 100 Mbps, demanded bandwidth for transmitting G2 is 50 Mbps, demanded bandwidth for transmitting G3 is 150 Mbps, and demanded bandwidth for transmitting G4 is 150 Mbps. The first link bandwidth is 2000 Mbps, and the second link bandwidth is 1000 Mbps. After the PE device 11 determines that the CE device 11 joins the first multicast group of the first multicast flow, the PE device 11 determines that the first ratio is (the demanded bandwidth of G1+the demanded bandwidth of G2)/the first link bandwidth, that is, the first ratio=(100 Mbps+50 Mbps)/2000 Mbps=0.075; and the PE device 11 determines that the second ratio is (the demanded bandwidth of G3+the demanded bandwidth of G4)/the second link bandwidth, that is, the second ratio=(150 Mbps+150 Mbps)/1000 Mbps=0.3.

After determining the first ratio and the second ratio, the PE device 11 determines, based on the first ratio and the second ratio that are obtained through calculation, whether the first ratio is less than the second ratio. For example, the first ratio is 0.075, and the second ratio is 0.3. The PE device 11 determines that the first ratio is less than the second ratio, so that the PE device 11 determines that the PE device 11 is a DF of the first multicast flow. In addition, the PE device 11 further determines that the PE device 12 is a non-DF of the first multicast flow. The PE device 11 stores entry information of the first multicast flow. In addition, the PE device 11 marks the PE device 11 as a DF corresponding to the entry information of the first multicast flow, and marks the PE device 12 as a non-DF corresponding to the entry information of the first multicast flow. After the PE device 11 determines that the PE device 11 is a DF of the first multicast flow, the PE device 11 allocates multicast service bandwidth to the first multicast flow. Correspondingly, the PE device 11 updates a value of the first allocated bandwidth. In this way, when subsequently receiving a multicast flow, the PE device 11 may determine a value of the first ratio and a value of the second ratio based on the latest bandwidth occupation status. Based on marking the PE device 11 as a DF corresponding to the entry information of the first multicast flow, the PE device 11 may also forward, to the CE device 11 through the Ethernet link 11, a multicast packet belonging to the first multicast flow.

According to the foregoing embodiment, in an EVPN scenario, after a PE device determines that a CE device connected to an Ethernet link joins a multicast group of a multicast flow, the PE device determines bandwidth occupation statuses of a plurality of Ethernet links included in an ES to which the Ethernet link belongs. Then the PE device determines, as a DF of the multicast flow based on the multicast flow bandwidth occupation statuses of the plurality of Ethernet links, a PE device corresponding to an Ethernet link that occupies lowest multicast flow bandwidth. This helps improve equalization of load sharing for multicast flow transmission on an EVPN. It should be understood that, in this embodiment of this application, the PE device 11 is used as an example to describe an implementation of determining a DF by a PE device connected to an Ethernet link in an ES. In an actual scenario, all PE devices connected to Ethernet links in an ES may implement DF determining processes according to the implementation of the PE device 11.

Optionally, the EVPN further includes a third PE device. The CE device is connected to the third PE device through a third Ethernet link. The third Ethernet link belongs to the ES. Before the first PE device determines whether the first ratio is less than the second ratio, the method further includes: The first PE device determines that the first ratio is less than a third ratio. The third ratio is a ratio of third allocated bandwidth to third link bandwidth. The third allocated bandwidth indicates allocated bandwidth of total bandwidth that is on the third Ethernet link and that can be allocated to a multicast service. The third link bandwidth indicates the total bandwidth that is on the third Ethernet link and that can be allocated to a multicast service.

With reference to the foregoing descriptions, FIG. 3 shows an embodiment in which an ES on an EVPN includes two Ethernet links. It should be understood that the implementation of FIG. 3 may be used in a scenario in which an ES includes more than two Ethernet links, that is, the implementation of FIG. 3 may be used in the scenario shown in FIG. 2. The EVPN further includes a third PE device. The CE device is connected to the third PE device through a third Ethernet link. The third Ethernet link belongs to the ES. The third PE device is the PE device 13 in FIG. 2, and the third Ethernet link is the Ethernet link 13 in FIG. 2. In this embodiment of this application, the foregoing features may be equivalent to corresponding features, unless otherwise specified.

According to the foregoing embodiment, the CE device 11 sends the first multicast group join packet to the PE device 11 through the Ethernet link 11. After receiving the first multicast group join packet, the PE device 11 adds the CE device 11 to the first multicast group of the first multicast flow based on the first multicast group join packet. After receiving the first multicast group join packet, the PE device 11 further sends the first join synchronization route to the PE device 13. After receiving the first join synchronization route, the PE device 13 adds the CE device 11 to the first multicast group of the first multicast flow based on the first join synchronization route. In this way, the PE device 13 may confirm that the CE device 11 becomes a multicast group member in the first multicast group, and the CE device 11 may receive, through the Ethernet link 13, the first multicast flow forwarded by the PE device 13. In another possible implementation, alternatively, the CE device 11 may send a multicast group join packet to the PE device 13 through the Ethernet link 13, and then the PE device 13 generates a corresponding join synchronization route based on the multicast group join packet, and sends the join synchronization route to the PE device 11 and the PE device 12. Therefore, all the PE device 11, the PE device 12, and the PE device 13 may confirm that the CE device 11 joins the first multicast group of the first multicast flow.

Before determining the third ratio, the PE device 11 may obtain the third link bandwidth of the Ethernet link 13 according to the foregoing embodiment. The third link bandwidth indicates the total bandwidth that is on the Ethernet link 13 and that can be allocated to a multicast service. For example, the third link bandwidth indicates total bandwidth used for forwarding a multicast service by the PE device 13 to the CE device 11 through the Ethernet link 13. Then the PE device 11 determines the third ratio. The third ratio is the ratio of the third allocated bandwidth to the third link bandwidth. The third allocated bandwidth indicates the allocated bandwidth of the total bandwidth that is on the Ethernet link 13 and that can be allocated to a multicast service. For example, the third ratio is a ratio of a sum of demanded bandwidth of a multicast flow for which the PE device 13 serves as a DF and the CE device 11 serves as a multicast group member to the third link bandwidth. For an implementation of obtaining the third link bandwidth and determining the third ratio by the PE device 13, refer to the foregoing embodiment of this application. Details are not described herein.

According to the foregoing embodiment, after the PE device 11 determines ratios corresponding to all Ethernet links included in the ES 01 (for example, the first ratio, the second ratio, and the third ratio), the PE device 11 determines a smallest ratio among the ratios corresponding to all the Ethernet links, so that the PE device 11 can determine, based on the determined smallest ratio, a DF responsible for forwarding the first multicast flow. In an exemplary implementation, the PE device 11 may select any two ratios from the ratios corresponding to all the Ethernet links, and compare the two ratios to obtain a smaller ratio. Then the PE device 11 obtains, from the ratios corresponding to all the Ethernet links, a ratio that is not included in the comparison, and compares the ratio with the smaller ratio until the smallest ratio among the ratios corresponding to all the Ethernet links included in the ES 01 is obtained. As shown in FIG. 3, the PE device 11 first determines whether the first ratio is less than the third ratio. When the PE device 11 determines that the first ratio is less than the third ratio, the PE device 11 further determines whether the first ratio is less than the second ratio. If the PE device 11 determines that the first ratio is less than the second ratio, the PE device 11 may determine that the first ratio is the smallest ratio among the ratios corresponding to all the Ethernet links included in the ES 01. Therefore, the PE device 11 serves as a DF for forwarding the first multicast flow to the CE device 11. For an implementation of determining, by the PE device 11, that the first ratio is less than the third ratio, refer to the descriptions in the foregoing embodiment of this application. Details are not described herein.

It should be understood that both the PE device 12 and the PE device 13 in FIG. 3 may determine a DF of the first multicast flow according to the implementation of the PE device 11. For example, with reference to the foregoing implementation, the PE device 11 determines that the PE device 11 is a DF of the first multicast flow, and determines that the PE device 12 and the PE device 13 are non-DFs of the first multicast flow. Correspondingly, the PE device 12 determines that the PE device 11 is a DF of the first multicast flow, and determines that the PE device 12 and the PE device 13 are non-DFs of the first multicast flow; and the PE device 13 determines that the PE device 11 is a DF of the first multicast flow, and determines that the PE device 12 and the PE device 13 are non-DFs of the first multicast flow. In this way, DF results determined by the PE device 11, the PE device 12, and the PE device 13 are the same, thereby ensuring that the PE device 11 is responsible for forwarding the first multicast flow, and preventing the CE device 11 from performing dual-reception of traffic or multi-reception of traffic.

Optionally, the method further includes: When the first PE device determines that the first ratio is not less than the second ratio and the first ratio is greater than the second ratio, the first PE device determines that the first PE device is a non-DF of the first multicast flow. In response to the determining, by the first PE device, that the first PE device is a non-DF of the first multicast flow, the first PE device skips allocating bandwidth to the first multicast flow.

With reference to the foregoing descriptions, in the scenario shown in FIG. 1, if the first ratio is greater than the second ratio, the PE device 11 determines that the PE device 11 is a non-DF of the first multicast flow, and determines that the PE device 12 is a DF of the first multicast flow. Correspondingly, according to the foregoing implementation, the PE device 12 also determines that the PE device 11 is a non-DF of the first multicast flow, and determines that the PE device 12 is a DF of the first multicast flow. Therefore, the PE device 11 does not allocate bandwidth to the first multicast flow, that is, the PE device 11 is configured to skip forwarding, to the CE device, a multicast packet belonging to the first multicast flow, and the PE device 12 is configured to forward, to the CE device, a multicast packet belonging to the first multicast flow. Correspondingly, because the PE device 11 determines that the PE device 12 is a DF of the first multicast flow, the PE device 11 updates a value of the second allocated bandwidth that is stored on the PE device 11, so that an updated value of the second allocated bandwidth includes demanded bandwidth of the first multicast flow. In the scenario shown in FIG. 2, if the first ratio is greater than the second ratio and the first ratio is less than the third ratio, the PE device 11 determines that the PE device 11 and the PE device 13 are non-DFs of the first multicast flow, and determines that the PE device 12 is a DF of the first multicast flow. Correspondingly, results determined by the PE device 12 and the PE device 13 are the same as a result determined by the PE device 11.

The PE device 11 is configured to skip forwarding, to the CE device, a multicast packet belonging to the first multicast flow. In a possible implementation, after determining that the PE device 11 is a non-DF of the first multicast flow, the PE device 11 sends an advertisement message to the PE device 21. The advertisement message indicates that the PE device 11 is a non-DF of the first multicast flow. Based on the advertisement message, the PE device 21 no longer forwards a multicast packet of the first multicast flow to the PE device 11. In another possible implementation, after determining that the PE device 11 is a non-DF of the first multicast flow, the PE device 11 continues to receive a multicast packet, forwarded by the PE device 21, of the first multicast flow. After receiving the multicast packet of the first multicast flow, the PE device 11 directly discards the multicast packet of the first multicast flow, or discards the multicast packet of the first multicast flow after the multicast packet ages.

Optionally, the method further includes: When the first PE device determines that the first ratio is not less than the second ratio and the first ratio is equal to the second ratio, and when the first PE device determines that a value of an IP address of the first PE device is greater than a value of an IP address of the second PE device, the first PE device determines that the first PE device is a DF of the first multicast flow. The first PE device is configured to forward, to the CE device through the first Ethernet link, a multicast packet belonging to the first multicast flow.

With reference to the foregoing descriptions, if the first ratio is equal to the second ratio, the PE device 11 further determines whether the value of the IP address of the PE device 11 is greater than the value of the IP address of the PE device 12. The IP address of the PE device 11 and the IP address of the PE device 12 are IP addresses used for establishing a BGP peer, and may be a device IP address of the PE device 11 and a device IP address of the PE device 12. When the value of the IP address of the PE device 11 is greater than the value of the IP address of the PE device 12, the PE device 11 determines that the PE device 11 is a DF of the first multicast flow, and the PE device 11 is responsible for forwarding, to the CE device 11, a multicast packet belonging to the first multicast flow.

Optionally, the method further includes: When the first PE device determines that the first ratio is not less than the second ratio and the first ratio is equal to the second ratio, and when the first PE device determines that the first link bandwidth is greater than the second link bandwidth, the first PE device determines that the first PE device is a DF of the first multicast flow. The first PE device is configured to forward, to the CE device through the first Ethernet link, a multicast packet belonging to the first multicast flow.

With reference to the foregoing descriptions, if the first ratio is equal to the second ratio, the PE device 11 further determines whether the first link bandwidth is greater than the second link bandwidth. When the first link bandwidth is greater than the second link bandwidth, the PE device 11 determines that the PE device 11 is a DF of the first multicast flow, and the PE device 11 is responsible for forwarding, to the CE device 11, a multicast packet belonging to the first multicast flow.

Optionally, the method further includes: When the first PE device determines that the first ratio is not less than the second ratio and the first ratio is equal to the second ratio, the first PE device determines, based on a hash algorithm, that the first PE device is a DF of the first multicast flow. The first PE device is configured to forward, to the CE device through the first Ethernet link, a multicast packet belonging to the first multicast flow.

With reference to the foregoing descriptions, if the first ratio is equal to the second ratio, the PE device 11 further determines the DF of the first multicast flow based on the hash algorithm.

In the following descriptions, FIG. 2 is used as an example to describe an implementation process of this embodiment of this application.

It is assumed that the EVPN scenario shown in FIG. 2 includes a multicast flow G1 to a multicast flow G9, a total of nine multicast flows. Demanded bandwidth of the multicast flow G1 to the multicast flow G5 is 90 Mbps, and demanded bandwidth of the multicast flow G6 to the multicast flow G9 is 150 Mbps. All the multicast flow G1 to the multicast flow G9 may be transmitted from the network side of the EVPN shown in FIG. 2 to the access side of the EVPN. The first link bandwidth is 1000 Mbps, the second link bandwidth is 2000 Mbps, and the third link bandwidth is 1000 Mbps. An IP address of the PE device 13 is the largest. The PE device 11, the PE device 12, and the PE device 13 may sequentially determine a DF of each multicast flow based on Table 1. This embodiment is described by using an example in which the PE device 11 performs a DF election process shown in Table 1. In addition, according to the foregoing embodiment, the PE device 11, the PE device 12, and the PE device 13 have synchronized the first link bandwidth, the second link bandwidth, and the third link bandwidth with each other.

TABLE 1

| Multicast flow | First ratio | Second ratio | Third ratio | Determined DF |
| --- | --- | --- | --- | --- |
| G1 | 0/1000 | 0/2000 | 0/1000 | PE 3 |
| G2 | 0/1000 | 0/2000 | 90/1000 | PE 2 |
| G7 | 0/1000 | 90/2000 | 90/1000 | PE 1 |
| G8 | 150/1000 | 90/2000 | 90/1000 | PE 2 |
| G3 | 150/1000 | 240/2000 | 90/1000 | PE 3 |
| G6 | 150/1000 | 240/2000 | 180/1000 | PE 2 |
| G5 | 150/1000 | 390/2000 | 180/1000 | PE 1 |
| G4 | 240/1000 | 390/2000 | 180/1000 | PE 3 |
| G9 | 240/1000 | 390/2000 | 270/1000 | PE 2 |
| / | 240/1000 | 540/2000 | 270/1000 | / |

Referring to Table 1, the $1^{st}$ column indicates multicast flows corresponding to multicast groups to which the CE device 11 sequentially joins; the $2^{nd}$ column, the $3^{rd}$ column, and the $4^{th}$ column respectively indicate the first ratio, the second ratio, and the third ratio that are determined according to the implementation methods in the foregoing embodiment; and the $5^{th}$ column indicates a DF, determined by the PE device 11, of a corresponding multicast flow.

Referring to the $1^{st}$ entry in Table 1, the multicast flow G1 is the $1^{st}$ multicast flow that the CE device 11 requests to receive. Therefore, a sum of demanded bandwidth of a multicast flow for which the PE device 11 serves as a DF and the CE device 11 serves as a multicast group member is 0, a sum of demanded bandwidth of a multicast flow for which the PE device 12 serves as a DF and the CE device 11 serves as a multicast group member is 0, and a sum of demanded bandwidth of a multicast flow for which the PE device 13 serves as a DF and the CE device 11 serves as a multicast group member is 0. When the CE device 11 joins a multicast group of the multicast flow G1, the PE device 11 determines that the first ratio, the second ratio, and the third ratio are the same, and are all 0. Further, the PE device 11 determines that a value of the IP address of the PE device 13 is the largest. Therefore, the PE device 11 determines that the PE device 13 is a DF of the multicast flow G1.

Referring to the $2^{nd}$ entry in Table 1, after the PE device 11 determines the DF for the multicast flow G1, the CE device 11 joins a multicast group of the multicast flow G2. The PE device 11 re-determines the first ratio, the second ratio, and the third ratio based on that the CE device 11 joins the multicast group of the multicast flow G2. The PE device 11 determines that both the first ratio and the second ratio are less than the third ratio, and the first ratio is equal to the second ratio. Further, the PE device 11 determines that the second link bandwidth is greater than the first link bandwidth. Therefore, the PE device 11 determines that the PE device 12 is a DF of the multicast flow G2.

Referring to the $2^{nd}$ entry in Table 1, after the PE device 11 determines the DF for the multicast flow G2, the CE device 11 joins a multicast group of the multicast flow G7. The PE device 11 re-determines the first ratio, the second ratio, and the third ratio based on that the CE device 11 joins the multicast group of the multicast flow G7. The PE device 11 determines that the first ratio is the smallest ratio. Therefore, the PE device 11 determines that the PE device 11 is a DF of the multicast flow G7.

DF election may be sequentially performed for the multicast flow G8, the multicast flow G3, the multicast flow G6, the multicast flow G5, the multicast flow G4, and the multicast flow G9 in Table 1 according to the foregoing rules in this embodiment. Details are not described herein again. The last entry in Table 1 indicates that, after completing DF election for the multicast flow G9, the PE device 11 stores an entry of the multicast flow G9 to the PE device 11, to re-determine the first ratio, the second ratio, and the third ratio when the CE device 11 subsequently joins a multicast group of a multicast flow. After the PE device 11 completes DF election according to the implementation shown in Table 1, multicast flows that the Ethernet link 11 is responsible for transmitting are the multicast flow G7 and the multicast flow G5, and a sum of demanded bandwidth of the multicast flows is 240 Mbps; multicast flows that the Ethernet link 12 is responsible for transmitting are the multicast flow G2, the multicast flow G8, the multicast flow G6, and the multicast flow G9, and a sum of demanded bandwidth of the multicast flows is 540 Mbps; and multicast flows that the Ethernet link 13 is responsible for transmitting are the multicast flow G1, the multicast flow G3, and the multicast flow G4, and a sum of demanded bandwidth of the multicast flows is 270 Mbps. In addition, the PE device 12 and the PE device 13 may also implement DF election according to the foregoing implementation process. Details are not described herein.

In the implementation shown in Table 1, demanded bandwidth of a multicast flow is an actual bandwidth value. Actual bandwidth values of the multicast flow G1 to the multicast flow G9 are preconfigured on the PE device 11, the PE device 12, and the PE device 13. In another possible implementation, the PE device 11, the PE device 12, and the PE device 13 may not be able to learn of an actual bandwidth value of each multicast flow. Therefore, demanded bandwidth of a multicast flow may be alternatively a bandwidth weight. As shown in Table 2, it is determined that a bandwidth weight of each multicast flow is 1.

TABLE 2

| Multicast flow | First ratio | Second ratio | Third ratio | Determined DF |
|---|---|---|---|---|
| G1 | 0/1000 | 0/2000 | 0/1000 | PE 3 |
| G2 | 0/1000 | 0/2000 | 1/1000 | PE 2 |
| G7 | 0/1000 | 1/2000 | 1/1000 | PE 1 |
| G8 | 1/1000 | 1/2000 | 1/1000 | PE 2 |
| G3 | 1/1000 | 2/2000 | 1/1000 | PE 3 |
| G6 | 1/1000 | 2/2000 | 2/1000 | PE 2 |
| G5 | 1/1000 | 3/2000 | 2/1000 | PE 1 |
| G4 | 2/1000 | 3/2000 | 2/1000 | PE 2 |
| G9 | 2/1000 | 4/2000 | 2/1000 | PE 3 |
| / | 2/1000 | 4/2000 | 3/1000 | / |

For a process of implementing DF election by the PE device 11 based on Table 2, refer to the descriptions of the process of implementing DF election by the PE device 11 based on Table 1. Details are not described herein. After the PE device 11 completes DF election according to the implementation shown in Table 2, multicast flows that the Ethernet link 11 is responsible for transmitting are the multicast flow G7 and the multicast flow G5, and a sum of demanded bandwidth of the multicast flows is 2; multicast flows that the Ethernet link 12 is responsible for transmitting are the multicast flow G2, the multicast flow G8, the multicast flow G6, and the multicast flow G4, and a sum of demanded bandwidth of the multicast flows is 4; and multicast flows that the Ethernet link 13 is responsible for transmitting are the multicast flow G1, the multicast flow G3, and the multicast flow G8, and a sum of demanded bandwidth of the multicast flows is 3.

Optionally, the first join synchronization route includes a first multicast DF extended community attribute. The first multicast DF extended community attribute carries an IP address of a PE device that serves as a DF of the first multicast flow.

According to the descriptions of the foregoing embodiment, the PE device 11 and the PE device 12 in FIG. 1 may separately determine a DF, and results determined by the PE device 11 and the PE device 12 are the same; and the PE device 11, the PE device 12, and the PE device 13 in FIG. 2 may separately determine a DF, and results determined by the PE device 11, the PE device 12, and the PE device 13 are the same. In another possible implementation, a process of determining a DF may be implemented by a PE device connected to an Ethernet link in an ES, and another PE device connected to an Ethernet link in the ES does not determine a DF. For example, the PE device 11 determines a DF of the first multicast flow according to the foregoing implementation, and the PE device 11 determines that the PE device 11 is a DF of the first multicast flow. The PE device 11 generates the first multicast DF extended community attribute. The first multicast DF extended community attribute is used to indicate the IP address of the DF of the first multicast flow, that is, the first multicast DF extended community attribute carries the IP address of the PE device 11. The PE device 11 may encapsulate the first multicast DF extended community attribute into the first join synchronization route mentioned in the foregoing embodiment. Then the PE device 11 sends the first join synchronization route to the PE device 12 or to the PE device 12 and the PE device 13. After receiving the first join synchronization route, the PE device 12 and the PE device 13 may not only determine, based on the first join synchronization route, that the CE device 11 joins the multicast group of the first multicast flow, but also learn, based on the IP address of the PE device 11 that is carried in the first multicast DF extended community attribute in the first join synchronization route, that the PE device 11 is determined as the DF of the first multicast flow. The PE device 12 and the PE device 13 directly record a mapping relationship between an entry of the first multicast flow and a DF, and the PE device 12 and the PE device 13 no longer perform a process of determining a DF of the first multicast flow. Therefore, a process of determining a DF of the first multicast flow is performed by the PE device 11, thereby further ensuring timing consistency between multi-homed PE devices connected to the CE device 11.

Optionally, the method further includes: The first PE device determines, based on a withdraw message that is specific to a first Ethernet auto-discovery per Ethernet segment route and that is received from the third PE device, that the third Ethernet link exits the ES. The withdraw message indicates that the third PE device withdraws the first Ethernet auto-discovery per Ethernet segment route. The first PE device determines, based on the first link bandwidth and the second link bandwidth, or based on the value of the IP address of the first PE device and the value of the IP address of the second PE device, a PE device that serves as a DF of a second multicast flow. Before the third Ethernet link exits the ES, the DF of the second multicast flow is the third PE device. The second multicast flow is a multicast flow transmitted by the multicast source of the EVPN to a multicast group member in a second multicast group. The CE device is a multicast group member in the second multicast group. The first PE device sends, to the second PE device, a third join synchronization route corresponding to the second multicast flow. The third join synchronization route includes a second multicast DF extended community attribute. The second multicast DF extended community attribute carries an IP address of the PE device that serves as the DF of the second multicast flow.

As shown in FIG. 2, an Ethernet link in the ES 01 may request to exit the ES 01, and a cause of exit may include: The Ethernet link fails, or the Ethernet link is no longer responsible for forwarding a multicast service. For example, the Ethernet link 13 requests to exit the ES 01. Correspondingly, the PE device 13 sends, to the PE device 11 and the PE device 12, the withdraw message specific to the first Ethernet auto-discovery per Ethernet segment (Ethernet A-D per ES) route. The withdraw message indicates that the PE device 13 withdraws the first Ethernet auto-discovery per Ethernet segment route. After receiving the withdraw message, the PE device 11 determines, based on a mapping relationship that is between a multicast flow entry and a DF and that is stored on the PE device 11, that the DF of the second multicast flow is the PE device 13. The second multicast flow is a multicast flow transmitted from the multicast source on the network side of the EVPN to a multicast group member in the second multicast group. The CE device 11 is a multicast group member in the second multicast group. The PE device 11 determines whether the first link bandwidth is greater than the second link bandwidth, or the PE device 11 determines whether the value of the IP address of the PE device 11 is greater than the value of the IP address of the PE device 12. When the first link bandwidth is greater than the second link bandwidth, or when the value of the IP address of the PE device 11 is greater than the value of the IP address of the PE device 12, the PE device 11 determines that the PE device 11 serves as a DF of the second multicast flow. The PE device 11 updates a correspondence that is between an entry of the second multicast flow and a DF and that is stored on the PE device 11. The PE device 11 further sends, to the PE device 12, the third join synchronization route corresponding to the second multicast flow. The third join synchronization route includes the second multicast DF extended community attribute. The second multicast DF extended community attribute carries the IP address of the PE device 11. In this way, the PE device 12 updates, based on the third join synchronization route, a correspondence that is between an entry of the second multicast flow and a DF and that is stored on the PE device 12. Correspondingly, when the first link bandwidth is less than the second link bandwidth, or when the value of the IP address of the PE device 11 is less than the value of the IP address of the PE device 12, the PE device 11 determines that the PE device 12 serves as a DF of the second multicast flow. The PE device 11 updates a correspondence that is between an entry of the second multicast flow and a DF and that is stored on the PE device 11. The PE device 11 further sends, to the PE device 12, the third join synchronization route corresponding to the second multicast flow. The third join synchronization route includes the second multicast DF extended community attribute. The second multicast DF extended community attribute carries the IP address of the PE device 12. In this way, the PE device 12 updates, based on the third join synchronization route, a correspondence that is between an entry of the second multicast flow and a DF and that is stored on the PE device 12.

According to the foregoing implementation, when an Ethernet link in an ES exits the ES, a multicast flow on the Ethernet link that exits the ES may be transferred to another Ethernet link in a timely manner, thereby ensuring that forwarding of the multicast flow is not interrupted. For the Ethernet auto-discovery per Ethernet segment route used in the foregoing implementation, refer to corresponding explanations in the RFC7432. Details are not described herein.

Optionally, the method further includes: When the first PE device determines that the first ratio is not less than the second ratio and the first ratio is greater than the second ratio, the first PE device determines that the first PE device is a non-DF of the first multicast flow. In response to the determining, by the first PE device, that the first PE device is a non-DF of the first multicast flow, the first PE device skips allocating bandwidth to the first multicast flow. The first PE device determines, based on a second Ethernet auto-discovery per Ethernet segment route received from a fourth PE device, that a fourth Ethernet link joins the ES. The CE device is connected to the fourth PE device through the fourth Ethernet link. The first PE device changes a PE device that serves as a DF of a third multicast flow from the first PE device to the fourth PE device. The third multicast flow is a multicast flow transmitted by the multicast source of the EVPN to a multicast group member in a third multicast group. The CE device is a multicast group member in the third multicast group. The first PE device sends, to the second PE device and the fourth PE device, a fourth join synchronization route corresponding to the third multicast flow. The fourth join synchronization route includes a third multicast DF extended community attribute. The third multicast DF extended community attribute carries an IP address of the fourth PE device.

With reference to the foregoing descriptions, when a new Ethernet link joins an ES, a multicast flow that is in the ES and whose DF has been determined may be migrated to the new Ethernet link. For example, based on the network scenario shown in FIG. 1, the new Ethernet link 13 joins the ES 01, to obtain the network scenario shown in FIG. 2. The PE device 13 corresponds to the fourth PE device, and the Ethernet link 13 corresponds to the fourth Ethernet link.

The PE device 13 generates the second Ethernet auto-discovery per Ethernet segment route, and the PE device 13 sends the second Ethernet auto-discovery per Ethernet segment route to the PE device 11 and the PE device 12. The second Ethernet auto-discovery per Ethernet segment route is used to indicate that the Ethernet link 13 requests to join the ES 01. The PE device 11 receives the second Ethernet auto-discovery per Ethernet segment route, and determines, based on the second Ethernet auto-discovery per Ethernet segment route, that the Ethernet link 13 joins the ES 01. According to the foregoing embodiment, when the PE device 11 determines that the first ratio is greater than the second ratio, the PE device 11 may change the PE device that serves as the DF of the third multicast flow from the PE device 11 to the PE device 13. For example, the PE device 11 updates a correspondence that is between an entry of the third multicast flow and a DF and that is stored on the PE device 11, and updates the DF of the third multicast flow from the PE device 11 to the PE device 13. Then the PE device 11 sends, to the PE device 12 and the PE device 13, the fourth join synchronization route corresponding to the third multicast flow. The fourth join synchronization route includes the third multicast DF extended community attribute. The third multicast DF extended community attribute carries the IP address of the PE device 13. The PE device 12 receives the fourth join synchronization route, and updates the DF of the third multicast flow from the PE device 11 to the PE device 13 based on the IP address of the PE device 13 in the fourth join synchronization route. The PE device 12 receives the fourth join synchronization route, and stores a correspondence between an entry of the third multicast flow and a DF based on the IP address of the PE device 13 in the fourth join synchronization route.

According to the foregoing implementation, when a new Ethernet link joins an ES, a multicast flow on an Ethernet link with comparatively high bandwidth usage in the ES may be migrated to the new Ethernet link, thereby improving equalization between Ethernet links in the ES.

Figure 4:
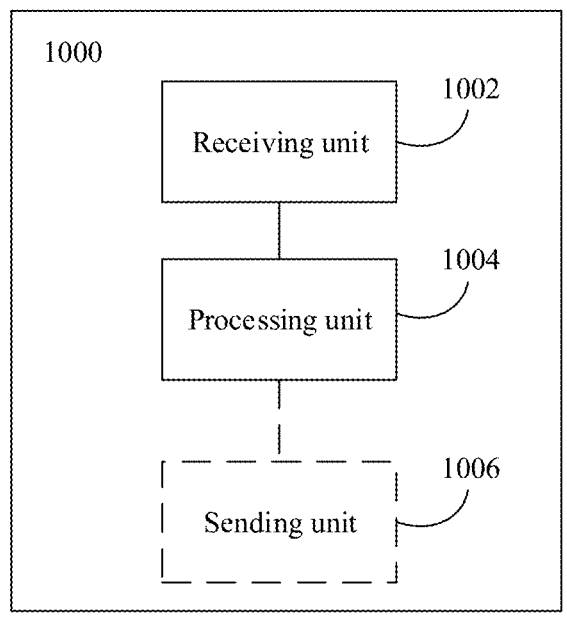
FIG. 4 is a schematic structural diagram of a first PE device according to an embodiment of this application.

FIG. 4 is a schematic structural diagram of a first PE device 1000 according to an embodiment of this application. The first PE device 1000 shown in FIG. 4 may perform corresponding steps that are performed by the first PE device in the methods in the foregoing embodiments. The first PE device is deployed on an EVPN. The EVPN further includes a second PE device and a CE device. The CE device is connected to the first PE device through a first Ethernet link. The CE device is connected to the second PE device through a second Ethernet link. The first Ethernet link and the second Ethernet link belong to one ES. As shown in FIG. 4, the first PE device 1000 includes a receiving unit 1002 and a processing unit 1004.

The receiving unit 1002 is configured to receive a first join packet. The first join packet is used to indicate that the CE device requests to join a first multicast group for receiving a first multicast flow. The first multicast flow is a multicast flow transmitted by a multicast source of the EVPN to a multicast group member in the first multicast group.

The processing unit 1004 is configured to add the CE device to the first multicast group based on the first join packet.

The processing unit 1004 is further configured to determine whether a first ratio is less than a second ratio. The first ratio is a ratio of first allocated bandwidth to first link bandwidth. The first allocated bandwidth indicates allocated bandwidth of total bandwidth that is on the first Ethernet link and that can be allocated to a multicast service. The first link bandwidth indicates the total bandwidth that is on the first Ethernet link and that can be allocated to a multicast service. The second ratio is a ratio of second allocated bandwidth to second link bandwidth. The second allocated bandwidth indicates allocated bandwidth of total bandwidth that is on the second Ethernet link and that can be allocated to a multicast service. The second link bandwidth indicates the total bandwidth that is on the second Ethernet link and that can be allocated to a multicast service.

When the processing unit 1004 determines that the first ratio is less than the second ratio, the processing unit 1004 is further configured to determine that the first PE device is a DF of the first multicast flow.

In response to the determining, by the processing unit 1004, that the first PE device is a DF of the first multicast flow, the processing unit 1004 is further configured to allocate bandwidth to the first multicast flow.

Optionally, the EVPN further includes a third PE device. The CE device is connected to the third PE device through a third Ethernet link. The third Ethernet link belongs to the ES. Before the processing unit 1004 determines whether the first ratio is less than the second ratio, the processing unit 1004 is further configured to determine that the first ratio is less than a third ratio. The third ratio is a ratio of third allocated bandwidth to third link bandwidth. The third allocated bandwidth indicates allocated bandwidth of total bandwidth that is on the third Ethernet link and that can be allocated to a multicast service. The third link bandwidth indicates the total bandwidth that is on the third Ethernet link and that can be allocated to a multicast service.

Optionally, when the processing unit 1004 determines that the first ratio is not less than the second ratio and the first ratio is greater than the second ratio, the processing unit 1004 is further configured to determine that the first PE device is a non-DF of the first multicast flow. In response to the determining, by the processing unit 1004, that the first PE device is a non-DF of the first multicast flow, the processing unit 1004 is further configured to skip allocating bandwidth to the first multicast flow.

Optionally, when the processing unit 1004 determines that the first ratio is not less than the second ratio and the first ratio is equal to the second ratio, and when the processing unit 1004 determines that a value of an IP address of the first PE device is greater than a value of an IP address of the second PE device, the processing unit 1004 is further configured to determine that the first PE device is a DF of the first multicast flow.

Optionally, when the processing unit 1004 determines that the first ratio is not less than the second ratio and the first ratio is equal to the second ratio, and when the processing unit 1004 determines that the first link bandwidth is greater than the second link bandwidth, the processing unit 1004 is further configured to determine that the first PE device is a DF of the first multicast flow.

Optionally, when the processing unit 1004 determines that the first ratio is not less than the second ratio and the first ratio is equal to the second ratio, the processing unit 1004 is further configured to determine, based on a hash algorithm, that the first PE device is a DF of the first multicast flow.

Optionally, the first PE device further includes a sending unit 1006. Before the processing unit 1004 determines whether the first ratio is less than the second ratio, the receiving unit 1002 is further configured to receive a second Ethernet segment route sent by the second PE device. The second Ethernet segment route includes a second link bandwidth extended community attribute. The second link bandwidth extended community attribute is used to carry the second link bandwidth. The sending unit 1006 is configured to send a first Ethernet segment route to the second PE device. The first Ethernet segment route includes a first link bandwidth extended community attribute. The first link bandwidth extended community attribute is used to carry the first link bandwidth.

Optionally, the first join packet is a multicast group join packet sent by the CE device. Further, optionally, the sending unit 1006 is configured to send a first join synchronization route to the second PE device. The first join synchronization route is used to indicate that the CE device requests to join the first multicast group for receiving the first multicast flow. Further, optionally, the first join synchronization route includes a first multicast DF extended community attribute. The first multicast DF extended community attribute carries an IP address of a PE device that serves as a DF of the first multicast flow.

Optionally, the first join packet is a second join synchronization route sent by the second PE device.

Optionally, the processing unit 1004 is further configured to determine, based on a withdraw message that is specific to a first Ethernet auto-discovery per Ethernet segment route and that is received from the third PE device, that the third Ethernet link exits the ES. The withdraw message indicates that the third PE device withdraws the first Ethernet auto-discovery per Ethernet segment route. The processing unit 1004 is further configured to determine, based on the first link bandwidth and the second link bandwidth, or based on the value of the IP address of the first PE device and the value of the IP address of the second PE device, a PE device that serves as a DF of a second multicast flow. Before the third Ethernet link exits the ES, the DF of the second multicast flow is the third PE device. The second multicast flow is a multicast flow transmitted by the multicast source of the EVPN to a multicast group member in a second multicast group. The CE device is a multicast group member in the second multicast group. The sending unit 1006 is configured to send, to the second PE device, a third join synchronization route corresponding to the second multicast flow. The third join synchronization route includes a second multicast DF extended community attribute. The second multicast DF extended community attribute carries an IP address of the PE device that serves as the DF of the second multicast flow.

Optionally, when the processing unit 1004 determines that the first ratio is not less than the second ratio and the first ratio is greater than the second ratio, the processing unit 1004 is further configured to determine that the first PE device is a non-DF of the first multicast flow. In response to the determining, by the processing unit 1004, that the first PE device is a non-DF of the first multicast flow, the processing unit 1004 is further configured to skip allocating bandwidth to the first multicast flow. The processing unit 1004 is further configured to determine, based on a second Ethernet auto-discovery per Ethernet segment route received from a fourth PE device, that a fourth Ethernet link joins the ES. The CE device is connected to the fourth PE device through the fourth Ethernet link. The processing unit 1004 is further configured to change a PE device that serves as a DF of a third multicast flow from the first PE device to the fourth PE device. The third multicast flow is a multicast flow transmitted by the multicast source of the EVPN to a multicast group member in a third multicast group. The CE device is a multicast group member in the third multicast group. The sending unit 1006 is configured to send, to the second PE device and the fourth PE device, a fourth join synchronization route corresponding to the third multicast flow. The fourth join synchronization route includes a third multicast DF extended community attribute. The third multicast DF extended community attribute carries an IP address of the fourth PE device.

The first PE device shown in FIG. 4 may perform corresponding steps that are performed by the first PE device in the methods in the foregoing embodiments. In an EVPN scenario, after a PE device determines that a CE device connected to an Ethernet link joins a multicast group of a multicast flow, the PE device determines bandwidth occupation statuses of a plurality of Ethernet links included in an ES to which the Ethernet link belongs. Then the PE device determines, as a DF of the multicast flow based on the multicast flow bandwidth occupation statuses of the plurality of Ethernet links, a PE device corresponding to an Ethernet link that occupies lowest multicast flow bandwidth. This helps improve equalization of load sharing for multicast flow transmission on an EVPN.

Figure 5:
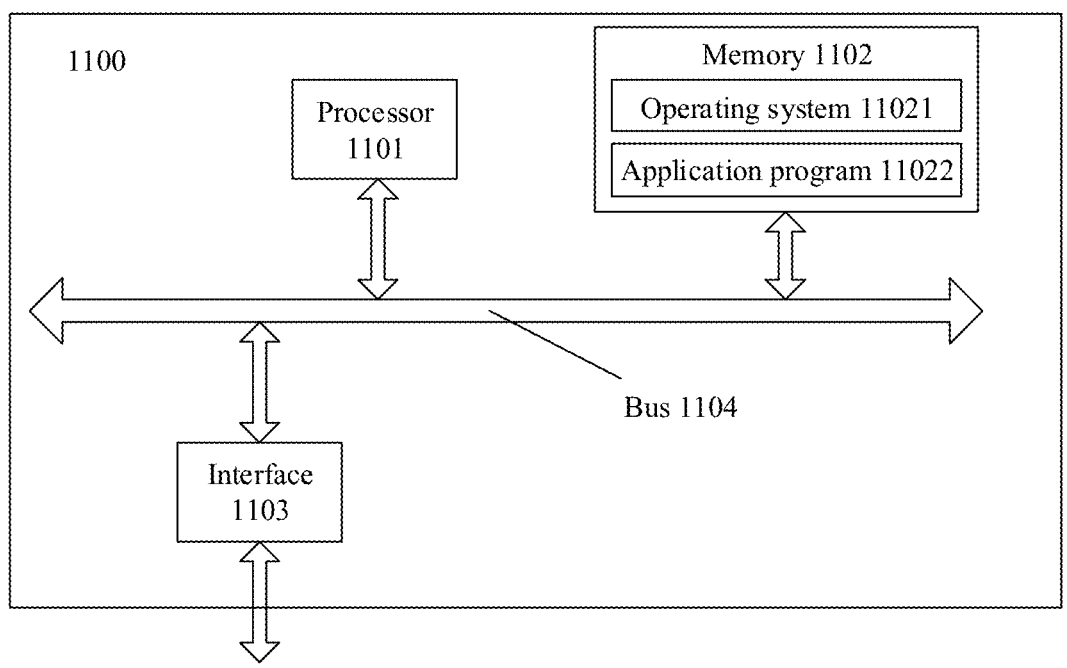
FIG. 5 is a schematic diagram of a hardware structure of a first PE device according to an embodiment of this application.

FIG. 5 is a schematic diagram of a hardware structure of a first PE device 1100 according to an embodiment of this application. The first PE device 1100 shown in FIG. 5 may perform corresponding steps that are performed by the first PE device in the methods in the foregoing embodiments.

As shown in FIG. 5, the first PE device 1100 includes a processor 1101, a memory 1102, an interface 1103, and a bus 1104. The interface 1103 may be implemented in a wireless or wired manner. For example, the interface 1103 may be a network interface card. The processor 1101, the memory 1102, and the interface 1103 are connected by using the bus 1104.

The interface 1103 may include a transmitter and a receiver, configured to send and receive information between the first PE device and the second PE device, the third PE device, the fourth PE device, or the CE device in the foregoing embodiment. For example, the interface 1103 is configured to support receiving a join packet sent by the CE device or the second PE device. For another example, the interface 1103 is configured to support receiving an Ethernet segment route sent by the second PE device. For still another example, the interface 1103 is configured to support sending an Ethernet segment route or a join synchronization route to the second PE device. For example, the interface 1103 is configured to support the process S101 in FIG. 3. The processor 1101 is configured to perform processing that is performed by the first PE device in the foregoing embodiment. For example, the processor 1101 is configured to add the CE device to the first multicast group based on the join packet, determine whether the first ratio is less than the second ratio, determine that the first PE device is a DF of the first multicast flow, allocates bandwidth to the first multicast flow, and/or perform other processes for the technology described in this specification. For example, the processor 1101 is configured to support the processes S102, S103, S104, and S105 in FIG. 3. The memory 1102 includes an operating system 11021 and an application program 11022, and is configured to store programs, code, or instructions. When the processor or a hardware device executes the programs, the code, or the instructions, the processing processes related to the first PE device in the method embodiments may be performed. Optionally, the memory 1102 may include a read-only memory (ROM) and a random access memory (RAM). The ROM includes a basic input/output system (BIOS) or an embedded system. The RAM includes an application program and an operating system. When the first PE device 1100 needs to operate, the first PE device 1100 may be started by using a bootloader boot system in the BIOS or the embedded system that is solidified in the ROM, to guide the first PE device 1100 into a normal operating state. After the first PE device 1100 enters the normal operating state, the application program and the operating system in the RAM are run, to perform the processing processes related to the first PE device in the method embodiments.

It can be understood that FIG. 5 shows merely a simplified design of the first PE device 1100. In actual application, the first PE device may include any quantity of interfaces, processors, or memories.

Figure 6:
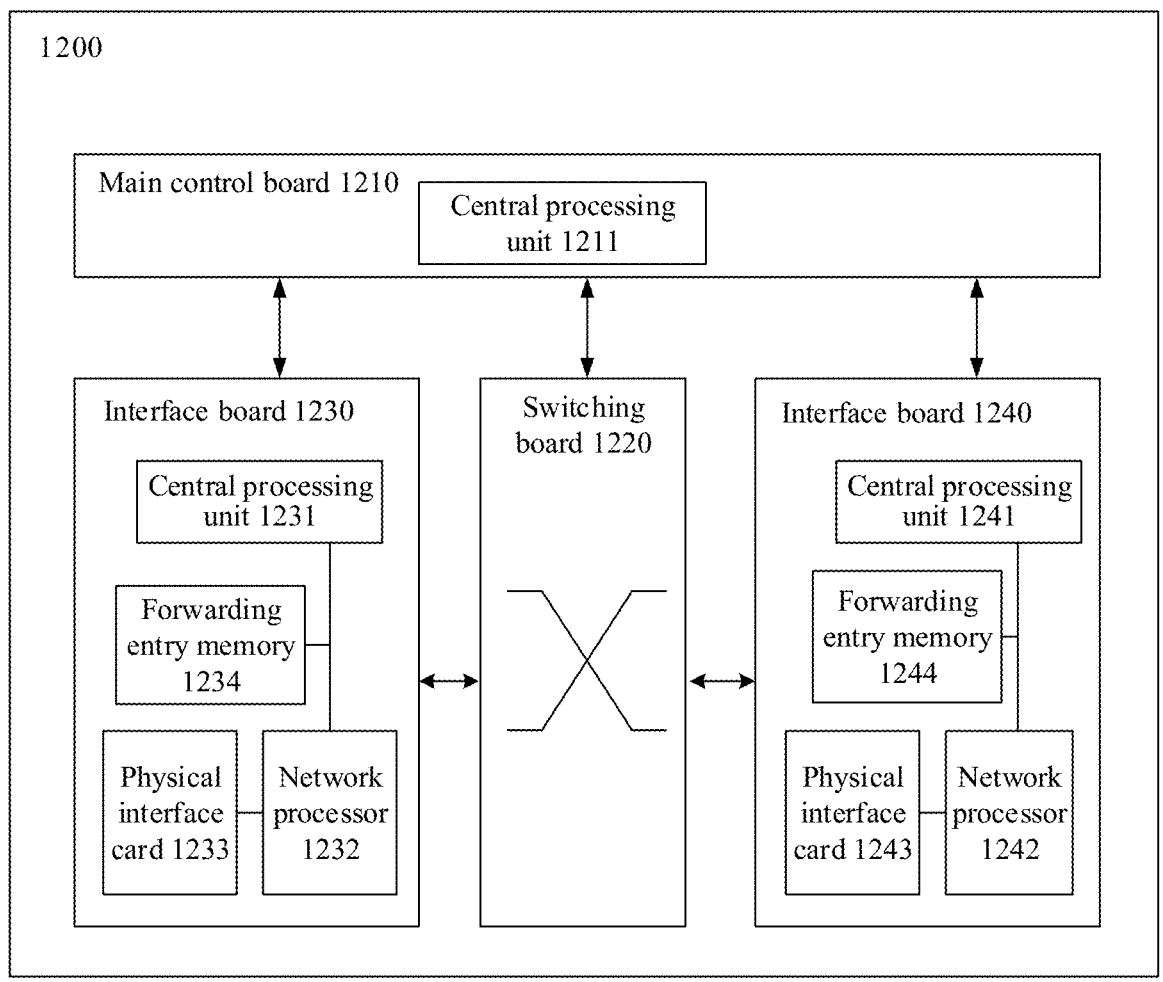
FIG. 6 is a schematic diagram of a hardware structure of another first PE device according to an embodiment of this application.

FIG. 6 is a schematic diagram of a hardware structure of another first PE device 1200 according to an embodiment of this application. The first PE device 1200 shown in FIG. 6 may perform corresponding steps that are performed by the first PE device in the methods in the foregoing embodiments.

As shown in FIG. 6, the first PE device 1200 includes a main control board 1210, an interface board 1230, a switching board 1220, and an interface board 1240. The main control board 1210, the interface boards 1230 and 1240, and the switching board 1220 are connected to a system backplane by using a system bus to implement interworking. The main control board 1210 is configured to perform functions such as system management, device maintenance, and protocol processing. The switching board 1220 is configured to exchange data between interface boards (an interface board is also referred to as a line card or a service board). The interface boards 1230 and 1240 are configured to provide various service interfaces (for example, a packet over synchronous (POS) interface, a gigabit Ethernet (GE) interface, and an asynchronous transfer mode (ATM) interface), and forward packets.

The interface board 1230 may include a central processing unit 1231, a forwarding entry memory 1234, a physical interface card 1233, and a network processor 1232. The central processing unit 1231 is configured to control and manage the interface boards and communicate with a central processing unit on the main control board. The forwarding entry memory 1234 is configured to store a forwarding entry. The physical interface card 1233 is configured to send and receive traffic. The network processor 1232 is configured to control, based on the forwarding entry, the physical interface card 1233 to send and receive traffic.

For example, the physical interface card 1233 is configured to receive a join packet sent by the CE device or the second PE device, or the physical interface card 1233 is configured to receive an Ethernet segment route sent by the second PE device.

After receiving the join packet sent by the CE device or the second PE device, or receiving the Ethernet segment route sent by the second PE device, the physical interface card 1233 sends the join packet or the Ethernet segment route to the central processing unit 1211 by using the central processing unit 1231. The central processing unit 1211 processes the join packet or the Ethernet segment route.

The central processing unit 1211 is further configured to add the CE device to the first multicast group based on the join packet. The central processing unit 1211 is further configured to determine whether the first ratio is less than the second ratio. When the central processing unit 1211 determines that the first ratio is less than the second ratio, the central processing unit 1211 is further configured to determine that the first PE device is a DF of the first multicast flow. In response to the determining, by the central processing unit 1211, that the first PE device is a DF of the first multicast flow, the central processing unit 1211 is further configured to allocate bandwidth to the first multicast flow.

The central processing unit 1231 is further configured to control the network processor 1232 to obtain the forwarding entry in the forwarding entry memory 1234, and the central processing unit 1231 is further configured to control the network processor 1232 to send an Ethernet segment route or a join synchronization route to the second PE device by using the physical interface card 1233. The central processing unit 1231 is further configured to control the network processor 1232 to forward a multicast packet of the first multicast flow to the CE device by using the physical interface card 1233.

It should be understood that, operations on the interface board 1240 in this embodiment of the present application are consistent with those on the interface board 1230. For brevity, details are not described again. It should be understood that the first PE device 1200 in this embodiment may correspond to functions and/or various steps implemented in the foregoing method embodiments. Details are not described herein again.

In addition, it should be noted that there may be one or more main control boards, and when there are a plurality of main control boards, the main control boards may include an active main control board and a standby main control board. There may be one or more interface boards. More interface boards are provided as the first PE device has a stronger data processing capability. There may also be one or more physical interface cards on the interface board. There may be no switching board, or there may be one or more switching boards. When there are a plurality of switching boards, the switching boards may jointly implement load sharing and redundancy backup. In a centralized forwarding architecture, the first PE device may not need a switching board, and the interface board is responsible for processing service data of an entire system. In a distributed forwarding architecture, the first PE device may have at least one switching board, and data is exchanged between a plurality of interface boards by using the switching board, to provide a large-capacity data exchange and processing capability. Therefore, a data access and processing capability of the first PE device in the distributed architecture is stronger than that of a device in the centralized architecture. A specific architecture used depends on a specific networking and deployment scenario, and is not limited herein.

In addition, an embodiment of this application provides a computer storage medium, configured to store computer software instructions used by the first PE device. The computer storage medium contains a program designed for executing the foregoing method embodiments.

An embodiment of this application further includes an EVPN system. The EVPN system includes a first PE device. The first PE device is the first PE device in FIG. 4, FIG. 5, or FIG. 6.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an erasable programmable read-only memory (EPROM) memory, an electrically erasable programmable read-only memory (EEPROM) memory, a register, a hard disk, a removable magnetic disk, a compact disc read-only memory (CD-ROM), or a storage medium of any other form known in the art. For example, a storage medium is coupled to a processor, so that the processor can read information from the storage medium or write information into the storage medium. Certainly, the storage medium may be a component of the processor. The processor and the storage medium may be located in the application-specific integrated circuit (ASIC). In addition, the ASIC may be located in user equipment. Certainly, the processor and the storage medium may exist in the user equipment as discrete components.

A person skilled in the art should be aware that in the foregoing one or more examples, functions described in this application may be implemented by hardware or a combination of hardware and software. When the present application is implemented by a combination of hardware and software, the foregoing software may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing exemplary embodiments further describe the purpose, the technical solutions, and the beneficial effects of this application in detail. It should be understood that the foregoing descriptions are merely exemplary embodiments of this application.

What is claimed is:

1. A method for determining a designated forwarder (DF) of a multicast flow, wherein the method is used on an Ethernet virtual private network (EVPN), the EVPN comprises a first provider edge (PE) device, a second PE device, and a customer edge (CE) device, the CE device is connected to the first PE device through a first Ethernet link, the CE device is connected to the second PE device through a second Ethernet link, the first Ethernet link and the second Ethernet link belong to one Ethernet segment (ES), and the method comprises:

receiving, by the first PE device, a first join packet, wherein the first join packet is used to indicate that the CE device requests to join a first multicast group for receiving a first multicast flow, and the first multicast flow is a multicast flow transmitted by a multicast source of the EVPN to a multicast group member in the first multicast group;

adding, by the first PE device, the CE device to the first multicast group based on the first join packet;

determining to allocate bandwidth, by the first PE device, based on whether a first ratio is less than a second ratio, wherein the first ratio is a ratio of a first allocated bandwidth to a first link bandwidth, the first allocated bandwidth indicates an allocated bandwidth of the total bandwidth that is on the first Ethernet link and that can be allocated to a multicast service, the first link bandwidth indicates the total bandwidth that is on the first Ethernet link and that can be allocated to a multicast service, the second ratio is a ratio of a second allocated bandwidth to a second link bandwidth, the second allocated bandwidth indicates an allocated bandwidth of the total bandwidth that is on the second Ethernet link and that can be allocated to a multicast service, and the second link bandwidth indicates the total bandwidth that is on the second Ethernet link and that can be allocated to a multicast service;

based on the first PE device determining that the first ratio is less than the second ratio, determining, by the first PE device, that the first PE device is a DF of the first multicast flow; and in response to determining, by the first PE device, that the first PE device is a DF of the first multicast flow, allocating, by the first PE device, the bandwidth to the first multicast flow.

2. The method according to claim 1, wherein the EVPN further comprises a third PE device, the CE device is connected to the third PE device through a third Ethernet link, the third Ethernet link belongs to the ES, and before the determining to allocate the bandwidth, by the first PE device, based on whether a first ratio is less than a second ratio, the method further comprises:

determining, by the first PE device, that the first ratio is less than a third ratio, wherein the third ratio is a ratio of a third allocated bandwidth to a third link bandwidth, the third allocated bandwidth indicates an allocated bandwidth of the total bandwidth that is on the third Ethernet link and that can be allocated to a multicast service, and the third link bandwidth indicates the total bandwidth that is on the third Ethernet link and that can be allocated to a multicast service.

3. The method according to claim 2, wherein the method further comprises:

determining, by the first PE device based on a withdraw message for a first Ethernet auto-discovery per Ethernet segment route and that is received from the third PE device, that the third Ethernet link exits the ES, wherein the withdraw message indicates that the third PE device withdraws the first Ethernet auto-discovery per Ethernet segment route;

determining, by the first PE device based on the first link bandwidth and the second link bandwidth, or based on a value of an IP address of the first PE device and a value of an IP address of the second PE device, a PE device that serves as a DF of a second multicast flow, wherein before the third Ethernet link exits the ES, the DF of the second multicast flow is the third PE device, the second multicast flow is a multicast flow transmitted by the multicast source of the EVPN to a multicast group member in a second multicast group, and the CE device is a multicast group member in the second multicast group; and sending, by the first PE device to the second PE device, a third join synchronization route corresponding to the second multicast flow, wherein the third join synchronization route comprises a second multicast DF extended community attribute, and the second multicast DF extended community attribute carries an IP address of a PE device that serves as the DF of the second multicast flow.

4. The method according to claim 1, wherein the method further comprises:

based on the first PE device determining that the first ratio is greater than the second ratio, determining, by the first PE device, that the first PE device is a non-designated forwarder (non-DF) of the first multicast flow; and in response to the determining, by the first PE device, that the first PE device is a non-DF of the first multicast flow, skipping, by the first PE device, allocating the bandwidth to the first multicast flow.

5. The method according to claim 1, wherein the method further comprises:

based on the first PE device determining that the first ratio is equal to the second ratio, and based on the first PE device determining that a value of an internet protocol (IP) address of the first PE device is greater than a value of an IP address of the second PE device, determining, by the first PE device, that the first PE device is a DF of the first multicast flow.

6. The method according to claim 1, wherein the method further comprises:

based on the first PE device determining that the first ratio is equal to the second ratio, and based on the first PE device determining that the first link bandwidth is greater than the second link bandwidth, determining, by the first PE device, that the first PE device is a DF of the first multicast flow.

7. The method according to claim 1, wherein the method further comprises:

based on the first PE device determining that the first ratio is equal to the second ratio, determining, by the first PE device based on a hash algorithm, that the first PE device is a DF of the first multicast flow.

8. The method according to claim 1, wherein before the determining to allocate the bandwidth, by the first PE device, based on whether a first ratio is less than a second ratio, the method further comprises:

receiving, by the first PE device, a second Ethernet segment route sent by the second PE device, wherein the second Ethernet segment route comprises a second link bandwidth extended community attribute, and the second link bandwidth extended community attribute is used to carry the second link bandwidth; and sending, by the first PE device, a first Ethernet segment route to the second PE device, wherein the first Ethernet segment route comprises a first link bandwidth extended community attribute, and the first link bandwidth extended community attribute is used to carry the first link bandwidth.

9. The method according to claim 1, wherein the first join packet is a multicast group join packet sent by the CE device.

10. The method according to claim 9, wherein the method further comprises:

sending, by the first PE device, a first join synchronization route to the second PE device, wherein the first join synchronization route is used to indicate that the CE device requests to join the first multicast group for receiving the first multicast flow.

11. The method according to claim 10, wherein the first join synchronization route comprises a first multicast DF extended community attribute, and the first multicast DF extended community attribute carries an IP address of a PE device that serves as a DF of the first multicast flow.

12. The method according to claim 1, wherein the first join packet is a second join synchronization route sent by the second PE device.

13. The method according to claim 1, wherein the method further comprises:

based on the first PE device determining that the first ratio is greater than the second ratio, determining, by the first PE device, that the first PE device is a non-designated forwarder (non-DF) of the first multicast flow;

in response to the determining, by the first PE device, that the first PE device is a non-DF of the first multicast flow, skipping, by the first PE device, allocating the bandwidth to the first multicast flow;

determining, by the first PE device based on a second Ethernet auto-discovery per Ethernet segment route received from a fourth PE device, that a fourth Ethernet link joins the ES, wherein the CE device is connected to the fourth PE device through the fourth Ethernet link;

changing, by the first PE device, a PE device that serves as a DF of a third multicast flow from the first PE device to the fourth PE device, wherein the third multicast flow is a multicast flow transmitted by the multicast source of the EVPN to a multicast group member in a third multicast group, and the CE device is a multicast group member in the third multicast group; and sending, by the first PE device to the second PE device and the fourth PE device, a fourth join synchronization route corresponding to the third multicast flow, wherein the fourth join synchronization route comprises a third multicast DF extended community attribute, and the third multicast DF extended community attribute carries an IP address of the fourth PE device.

14. A first provider edge (PE) device, wherein the first PE device is used on an Ethernet virtual private network (EVPN), the EVPN further comprises a second PE device and a customer edge (CE) device, the CE device is connected to the first PE device through a first Ethernet link, the CE device is connected to the second PE device through a second Ethernet link, the first Ethernet link and the second Ethernet link belong to one Ethernet segment (ES), and the first PE device comprises:

a receiver configured to receive a first join packet, wherein the first join packet is used to indicate that the CE device requests to join a first multicast group for receiving a first multicast flow, and the first multicast flow is a multicast flow transmitted by a multicast source of the EVPN to a multicast group member in the first multicast group; and a processor configured to add the CE device to the first multicast group based on the first join packet, wherein the processor is further configured to determine to allocate bandwidth based on whether a first ratio is less than a second ratio, wherein the first ratio is a ratio of a first allocated bandwidth to a first link bandwidth, the first allocated bandwidth indicates an allocated bandwidth of the total bandwidth that is on the first Ethernet link and that can be allocated to a multicast service, the first link bandwidth indicates the total bandwidth that is on the first Ethernet link and that can be allocated to a multicast service, the second ratio is a ratio of a second allocated bandwidth to a second link bandwidth, the second allocated bandwidth indicates an allocated bandwidth of the total bandwidth that is on the second Ethernet link and that can be allocated to a multicast service, and the second link bandwidth indicates the total bandwidth that is on the second Ethernet link and that can be allocated to a multicast service;

based on the processor determining that the first ratio is less than the second ratio, the processor is further configured to determine that the first PE device is a designated forwarder (DF) of the first multicast flow; and in response to the determining, by the processor, that the first PE device is a DF of the first multicast flow, the processor is further configured to allocate the bandwidth to the first multicast flow.

15. The first PE device according to claim 14, wherein the EVPN further comprises a third PE device, the CE device is connected to the third PE device through a third Ethernet link, the third Ethernet link belongs to the ES, and before the processor determines to allocate the bandwidth based on whether the first ratio is less than the second ratio, the processor is further configured to determine that the first ratio is less than a third ratio, wherein the third ratio is a ratio of a third allocated bandwidth to a third link bandwidth, the third allocated bandwidth indicates an allocated bandwidth of the total bandwidth that is on the third Ethernet link and that can be allocated to a multicast service, and the third link bandwidth indicates the total bandwidth that is on the third Ethernet link and that can be allocated to a multicast service.

16. The first PE device according to claim 15, wherein the first PE device further comprises a transmitter;

the processor is further configured to determine, based on a withdraw message for a first Ethernet auto-discovery per Ethernet segment route and that is received from the third PE device, that the third Ethernet link exits the ES, wherein the withdraw message indicates that the third PE device withdraws the first Ethernet auto-discovery per Ethernet segment route;

the processor is further configured to determine, based on the first link bandwidth and the second link bandwidth, or based on a value of an IP address of the first PE device and a value of an IP address of the second PE device, a PE device that serves as a DF of a second multicast flow, wherein before the third Ethernet link exits the ES, the DF of the second multicast flow is the third PE device, the second multicast flow is a multicast flow transmitted by the multicast source of the EVPN to a multicast group member in a second multicast group, and the CE device is a multicast group member in the second multicast group; and the transmitter is configured to send, to the second PE device, a third join synchronization route corresponding to the second multicast flow, wherein the third join synchronization route comprises a second multicast DF extended community attribute, and the second multicast DF extended community attribute carries an IP address of a PE device that serves as the DF of the second multicast flow.

17. The first PE device according to claim 14, wherein based on the processor determining that the first ratio is greater than the second ratio, the processor is further configured to determine that the first PE device is a non-designated forwarder (non-DF) of the first multicast flow; and in response to the determining, by the processor, that the first PE device is a non-DF of the first multicast flow, the processor is further configured to skip allocating the bandwidth to the first multicast flow.

18. The first PE device according to claim 14, wherein based on the processor determining that the first ratio is equal to the second ratio, and based on the processor determining that a value of an internet protocol (IP) address of the first PE device is greater than a value of an IP address of the second PE device, the processor is further configured to determine that the first PE device is a DF of the first multicast flow.

19. The first PE device according to claim 14, wherein based on the processor determining that the first ratio is equal to the second ratio, and based on the processor determining that the first link bandwidth is greater than the second link bandwidth, the processor is further configured to determine that the first PE device is a DF of the first multicast flow.

20. The first PE device according to claim 14, wherein based on the processor determining that the first ratio is equal to the second ratio, the processor is further configured to determine, based on a hash algorithm, that the first PE device is a DF of the first multicast flow.

21. The first PE device according to claim 14, wherein the first PE device further comprises a transmitter, and before the processor determines to allocate the bandwidth based on whether the first ratio is less than the second ratio,
the receiver is further configured to receive a second Ethernet segment route sent by the second PE device, wherein the second Ethernet segment route comprises a second link bandwidth extended community attribute, and the second link bandwidth extended community attribute is used to carry the second link bandwidth; and
the transmitter is configured to send a first Ethernet segment route to the second PE device, wherein the first Ethernet segment route comprises a first link bandwidth extended community attribute, and the first link bandwidth extended community attribute is used to carry the first link bandwidth.

22. The first PE device according to claim 14, wherein the first join packet is a multicast group join packet sent by the CE device.

23. The first PE device according to claim 22, wherein the first PE device further comprises a transmitter; and
the transmitter is configured to send a first join synchronization route to the second PE device, wherein the first join synchronization route is used to indicate that the CE device requests to join the first multicast group for receiving the first multicast flow.

24. The first PE device according to claim 23, wherein the first join synchronization route comprises a first multicast DF extended community attribute, and the first multicast DF extended community attribute carries an IP address of a PE device that serves as a DF of the first multicast flow.

25. The first PE device according to claim 14, wherein the first join packet is a second join synchronization route sent by the second PE device.

26. The first PE device according to claim 14, wherein the first PE device further comprises a transmitter;
based on the processor determining that the first ratio is greater than the second ratio, the processor is further configured to determine that the first PE device is a non-designated forwarder (non-DF) of the first multicast flow;
in response to the determining, by the processor, that the first PE device is a non-DF of the first multicast flow, the processor is further configured to skip allocating the bandwidth to the first multicast flow;
the processor is further configured to determine, based on a second Ethernet auto-discovery per Ethernet segment route received from a fourth PE device, that a fourth Ethernet link joins the ES, wherein the CE device is connected to the fourth PE device through the fourth Ethernet link;
the processor is further configured to change a PE device that serves as a DF of a third multicast flow from the first PE device to the fourth PE device, wherein the third multicast flow is a multicast flow transmitted by the multicast source of the EVPN to a multicast group member in a third multicast group, and the CE device is a multicast group member in the third multicast group; and
the transmitter is configured to send, to the second PE device and the fourth PE device, a fourth join synchronization route corresponding to the third multicast flow, wherein the fourth join synchronization route comprises a third multicast DF extended community attribute, and the third multicast DF extended community attribute carries an IP address of the fourth PE device.

* * * * *